(12) United States Patent
Fong et al.

(10) Patent No.: US 11,748,038 B1
(45) Date of Patent: Sep. 5, 2023

(54) PHYSICAL HARDWARE CONTROLLER FOR PROVISIONING REMOTE STORAGE SERVICES ON PROCESSING DEVICES

(71) Applicant: Dell Products L.P., Round Rock, TX (US)

(72) Inventors: Victor Fong, Melrose, MA (US); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 17/676,584

(22) Filed: Feb. 21, 2022

(51) Int. Cl.
*G06F 3/06* (2006.01)
*G06F 13/42* (2006.01)

(52) U.S. Cl.
CPC ............ *G06F 3/0664* (2013.01); *G06F 3/061* (2013.01); *G06F 3/067* (2013.01); *G06F 13/4282* (2013.01); *G06F 2213/0026* (2013.01); *G06F 2213/0042* (2013.01)

(58) Field of Classification Search
CPC ........ G06F 3/061; G06F 3/067; G06F 3/0664; G06F 13/4282; G06F 2213/0026; G06F 2213/0042
See application file for complete search history.

(56) References Cited

U.S. PATENT DOCUMENTS

| | | | |
|---|---|---|---|
| 2017/0293448 A1* | 10/2017 | Bolen | G06F 3/061 |
| 2018/0275871 A1* | 9/2018 | Ptak | G06F 3/0644 |
| 2021/0250248 A1* | 8/2021 | Colgrove | H04L 67/1097 |

OTHER PUBLICATIONS

T. Liebetraut, K. Rechert, I. Valizada, K. Meier and D. Von Suchodoletz, "Emulation-as-a-Service—The Past in the Cloud," 2014 IEEE 7th International Conference on Cloud Computing, Anchorage, AK, USA, 2014, pp. 906-913, doi: 10.1109/CLOUD.2014.124. (Year: 2014).*

Maxim Integrated, "USB On-The-Go (OTG): Uses and Support," https://www.maximintegrated.com/en/design/technical-documents/tutorials/1/1822.html, Tutorials 1822, Accessed Feb. 18, 2022, 3 pages.

(Continued)

*Primary Examiner* — Eric T Oberly
(74) *Attorney, Agent, or Firm* — Ryan, Mason & Lewis, LLP

(57) ABSTRACT

An apparatus comprises a first processing device, the first processing device comprising a physical hardware controller configured for coupling with a second processing device. The first processing device is configured to identify one or more remote storage service instances attached to the second processing device, and to initiate storage emulation modules for the remote storage service instances attached to the second processing device, the storage emulation modules emulating one or more physical storage devices configured for attachment to the second processing device. The first processing device is also configured to provision the remote storage service instances to the second processing device by processing input/output requests that are directed to one or more storage volumes of the emulated physical storage devices utilizing hardware resources of the physical hardware controller and providing processing results of the input/output requests to the second processing device via the emulated physical storage devices.

20 Claims, 15 Drawing Sheets

(56) References Cited

OTHER PUBLICATIONS

D. Adib, "What is Edge Computing?" https://stlpartners.com/articles/edge-computing/what-is-edge-computing/, Accessed, Jan. 21, 2022, 10 pages.

J. James, "The Telco Edge Cloud Explained," https://mobiledgex.com/blog/2021/05/27/the-telco-edge-cloud-explained/, May 27, 2021, 3 pages.

Raspberry PI Ltd. "Raspberry Pi Zero 2 W," Oct. 2021, 6 pages.

Raspberry PI Ltd. "Setting up your Raspberry Pi," https://www.raspberrypi.com/documentation/computers/getting-started.html, Accessed Feb. 18, 2022, 19 pages.

Cloudfoundry Foundation, Inc. "Open Service Broker API," https://www.openservicebrokerapi.org/, Accessed Feb. 18, 2022, 5 pages.

O. Michel et al., "The Programmable Data Plane: Abstractions, Architectures, Algorithms, and Applications," ACM Computing Surveys, vol. 1, No. 1, Jan. 2021, 35 pages.

M. Tork et al., "Lynx: A SmartNIC-driven Accelerator-centric Architecture for Network Servers," Architectural Support for Programming Languages and Operating Systems, Mar. 2020, 15 pages.

The Linux Foundation Projects, "About DPDK," https://www.dpdk.org/about/, Accessed Feb. 18, 2022, 3 pages.

Y. Le et al., "UNO: Unifying Host and Smart NIC Offload for Flexible Packet Processing," Proceedings of the 2017 Symposium on Cloud Computing, Sep. 24-27, 2017, 14 pages.

Wikipedia, "Zombie (computing)" https://en.wikipedia.org/wiki/Zombie_(computing)#:~:text=In%20computing%2C%20a%20zombie%20is,remote%20direction%20of%20the%20hacker, Dec. 20, 2021, 3 pages.

Wikipedia, "Computing," https://en.wikipedia.org/wiki/Computing, Oct. 23, 2021, 16 pages.

Wikipedia, "Computer Security," https://en.wikipedia.org/wiki/Computer_security, Nov. 22, 2021, 51 pages.

Wikipedia, "Security Hacker," https://en.wikipedia.org/wiki/Security_hacker, Oct. 7, 2021, 16 pages.

Wikipedia, "Computer Virus," https://en.wikipedia.org/wiki/Computer_virus, Nov. 22, 2021, 22 pages.

Wikipedia, "Computer Worm," https://en.wikipedia.org/wiki/Computer_worm, Nov. 15, 2021, 7 pages.

Wikipedia, "Trojan Horse (computing)" https://en.wikipedia.org/wiki/Trojan_horse_(computing), Nov. 13, 2021, 6 pages.

Wikipedia, "Botnet," https://en.wikipedia.org/wiki/Botnet, Nov. 20, 2021, 15 pages.

Wikipedia, "Email Spam," https://en.wikipedia.org/wiki/Email_spam, Nov. 15, 2021, 15 pages.

Wikipedia, "Denial-of-service Attack," https://en.wikipedia.org/wiki/Denial-of-service_attack, Nov. 18, 2021, 28 pages.

* cited by examiner

PHYSICAL HARDWARE CONTROLLER FOR PROVISIONING REMOTE STORAGE SERVICES ON PROCESSING DEVICES

FIELD

The field relates generally to information processing, and more particularly to management of information processing systems.

BACKGROUND

Various client devices, such as laptops, desktops, etc., are installed with an operating system, referred to as a host operating system. Various software-defined services are controlled by the host operating system of such client devices. A host operating system, for example, may include hundreds of different services which collaborate with one another to run software on the hardware of a given client device. Each service typically has its own goals and characteristics, and may be used for performing different types of operations that utilize different types and amounts of hardware resources of client devices. Some services are processor-intensive (e.g., consuming significant amounts of processor or compute resources), while other services may be memory-intensive (e.g., consuming significant amounts of memory) or network-intensive (e.g., consuming significant amounts of network resources). The performance and user experience on a client device may be greatly affected by the particular numbers and types of services that run on that client device.

SUMMARY

Illustrative embodiments of the present disclosure provide techniques for provisioning remote storage services on a processing device utilizing a physical hardware controller coupled to the processing device.

In one embodiment, an apparatus comprises a first processing device. The first processing device comprises a physical hardware controller, and is configured for coupling with a second processing device. The first processing device is configured to perform steps of identifying one or more remote storage service instances attached to the second processing device, and initiating, at the first processing device, one or more storage emulation modules for the one or more remote storage service instances attached to the second processing device, the one or more storage emulation modules emulating one or more physical storage devices configured for attachment to the second processing device. The first processing device is also configured to perform the step of provisioning the one or more remote storage service instances to the second processing device by processing one or more input/output requests that are directed to one or more storage volumes of the emulated one or more physical storage devices utilizing hardware resources of the physical hardware controller and providing results of processing the one or more input/output requests to the second processing device via the emulated one or more physical storage devices.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
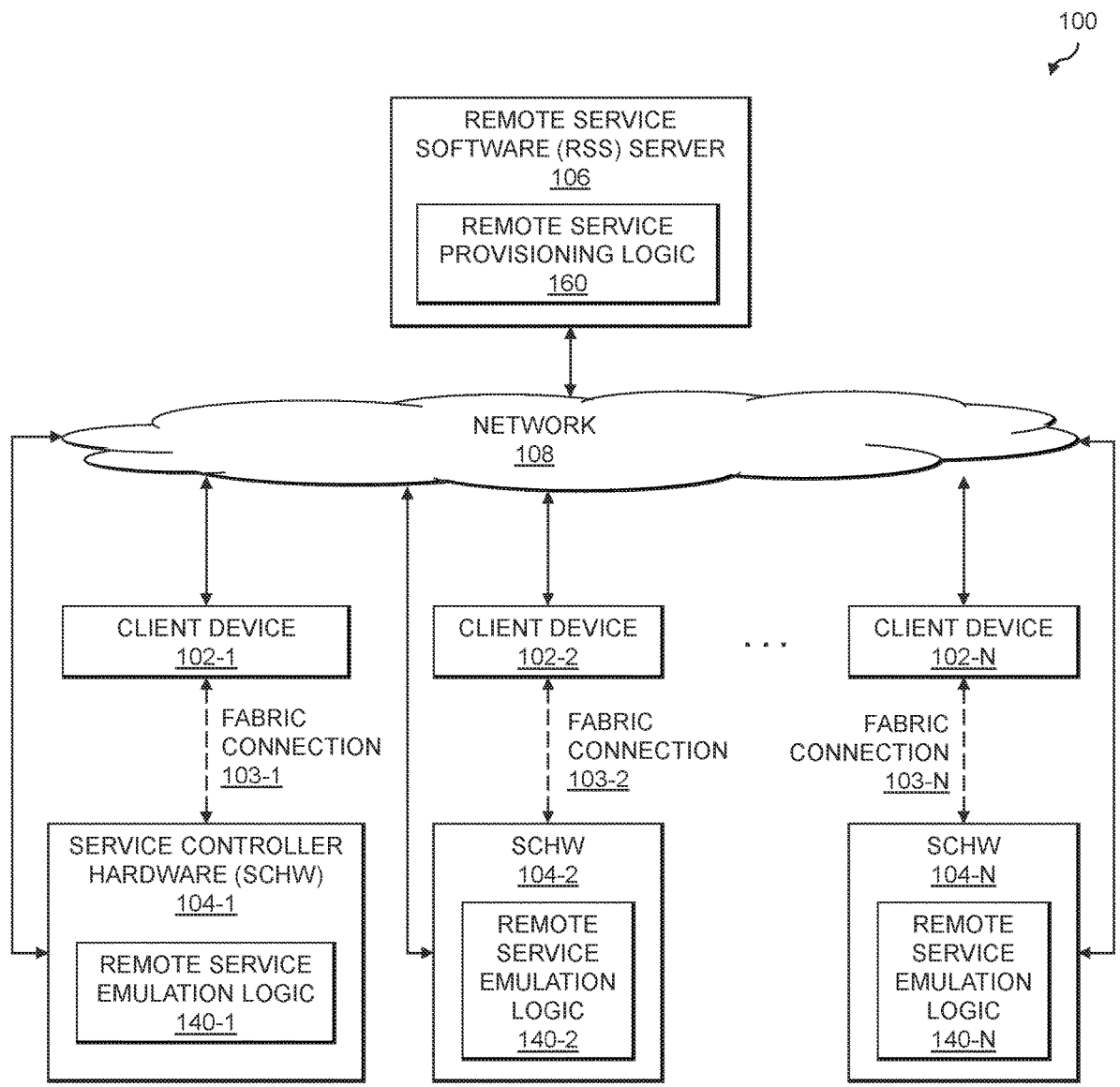
FIG. 1 is a block diagram of an information processing system configured for provisioning services on client devices using physical hardware controllers attached thereto in an illustrative embodiment.

FIG. 1 shows an information processing system 100 configured in accordance with an illustrative embodiment for provisioning services on processing devices using physical hardware controllers attached thereto. The information processing system 100 comprises a set of client devices 102-1, 102-2, . . . 102-N (collectively, client devices 102) which communicate with respective physical hardware controllers referred to as service controller hardware (SCHW) 104-1, 104-2, . . . 104-N (collectively, SCHW 104) via respective fabric connections 103-1, 103-2, . . . 103-N (collectively, fabric connections 103). The fabric connections 103 may comprise Universal Serial Bus (USB), Peripheral Component Interconnect Express (PCIe), or other types of high bandwidth and no (or minimal) latency fabrics. The client devices 102 and SCHW 104 are also configured for communication with a remote service software (RSS) server 106 via a network 108. Although in the FIG. 1 embodiment each of the client devices 102 and SCHW 104 have separate connections to the network 108, in other embodiments one or more of the SCHW 104 (e.g., SCHW 104-1) may connect to the network via its associated one of the client devices 102 (e.g., client device 102-1).

The client devices 102, may comprise, for example, physical computing devices such as Internet of Things (IoT) devices, mobile telephones, laptop computers, tablet computers, desktop computers or other types of devices, in any combination. Such devices are examples of what are more generally referred to herein as "processing devices." Some of these processing devices are also generally referred to herein as "computers." The client devices 102 may also or alternately comprise virtualized computing resources, such as virtual machines (VMs), containers, etc.

The client devices 102 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The SCHW 104 may comprise "miniature" computers or mini-computers. A mini-computer may be implemented as a single-board computer (SBC), a computer-on-module (COM) or system on a module (SOM), an embedded computer system, a system on chip (SoC), a system in a package (SiP), an integrated circuit, a hardware accelerator, etc. The SCHW 104 illustratively have their own process and memory space, and are capable of executing an operating system (OS) in a standalone fashion (e.g., separate from a host OS that runs or executes on the client devices 102).

The SCHW 104 may take on various form factors. In some embodiments, the SCHW 104 are implemented as embedded components of the client devices 102. In other embodiments, the SCHW 104 are implemented as external pluggable devices. In still other embodiments, some of the client devices 102 may be configured with embedded SCHW 104 while other client devices 102 are connected to external pluggable SCHW 104. It should also be noted that in some embodiments, one or more of the client devices 102 may be associated with multiple instances of SCHW. For example, a given client device may have both an embedded SCHW component and be connected to an external pluggable SCHW, or may have multiple instances of one or both of embedded SCHW and an external pluggable SCHW.

The RSS server 106 may be implemented as a standalone server, a set of servers or other types of systems, including but not limited to an edge computing site, cloud infrastructure comprising one or more clouds (e.g., one or more public clouds, one or more private clouds, one or more hybrid clouds, combinations thereof, etc.).

The network 108 may be implemented using multiple networks of different types. For example, the network 108 may comprise a portion of a global computer network such as the Internet, although other types of networks can be part of the network 108 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 108 in some embodiments therefore comprises combinations of multiple different types of networks each comprising processing devices configured to communicate using Internet Protocol (IP) or other related communication protocols.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Although not explicitly shown in FIG. 1, one or more input-output devices such as keyboards, displays or other types of input-output devices may be used to support one or more user interfaces to the client devices 102, the SCHW 104 and the RSS server 106, as well as to support communication between the client devices 102, the SCHW 104, the RSS server 106 and other related systems and devices not explicitly shown.

The SCHW 104 and the RSS server 106 in the FIG. 1 embodiment are assumed to be implemented using at least one processing device. Each such processing device generally comprises at least one processor and an associated memory, and implements one or more functional modules for controlling certain features of the SCHW 104 and the RSS server 106. In the FIG. 1 embodiment, the SCHW 104-1, 104-2, . . . 104-N implement respective instances of remote service emulation logic 140-1, 140-2, . . . 140-N (collectively, remote service emulation logic 140) which coordinate with remote service provisioning logic 160 on the RSS server 106 to provision services for the client devices 102. As will be described in further detail below, various different types of services may be provisioned utilizing the remote service emulation logic 140 and remote service provisioning logic 160, including but not limited to storage services, multimedia services, security or network monitoring services, etc.

At least portions of the functionality of the remote service emulation logic 140 and the remote service provisioning logic 160 may be implemented at least in part in the form of software that is stored in memory and executed by a processor.

The client devices 102, SCHW 104 and RSS server 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The client devices 102, SCHW 104 and RSS server 106 (or one or more components thereof such as the remote service emulation logic 140 and the remote service provisioning logic 160) may be implemented on respective distinct processing platforms, although numerous other arrangements are possible. For example, in some embodiments at least portions of one or more of the client devices 102 and one or more of the SCHW 104 are implemented on the same processing platform. Further, the RSS server 106 can be implemented at least in part within at least one processing platform that implements at least a subset of the client devices 102 and/or the SCHW 104.

The client devices 102, SCHW 104 and/or RSS server 106 in some embodiments may be implemented as part of a cloud-based system. The client devices 102, SCHW 104 and RSS server 106 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including network 108, the fabric connections 103, etc.

The term "processing platform" as used herein is intended to be broadly construed so as to encompass, by way of illustration and without limitation, multiple sets of processing devices and one or more associated storage systems that are configured to communicate over one or more networks. For example, distributed implementations of the client devices 102, SCHW 104 and RSS server 106 are possible, in which certain ones of the client devices 102 and their associated SCHW 104 reside in one data center in a first geographic location while other ones of the client devices 102 and their associated SCHW 104 reside in at least a second data center in at least a second geographic location that is potentially remote from the first geographic location. The RSS server 106 may be implemented at least in part in the first geographic location, the second geographic location, and one or more other geographic locations. Thus, it is possible in some implementations of the system 100 for different ones of the client devices 102, SCHW 104 and RSS server 106 to reside in different geographic locations. Numerous other distributed implementations of the client devices 102, SCHW 104 and RSS server 106 are possible.

Additional examples of processing platforms utilized to implement portions of the system 100 in illustrative embodiments will be described in more detail below in conjunction with FIGS. 14 and 15.

It is to be understood that the particular set of elements shown in FIG. 1 for provisioning services on the client devices 102 utilizing SCHW 104 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for provisioning services on client devices using physical hardware controllers attached thereto will now be described in more detail with reference to the flow diagram of FIG. 2. It is to be understood that this particular process is only an example, and that additional or alternative processes for provisioning services on client devices using physical hardware controllers attached thereto can be carried out in other embodiments.

In this embodiment, the process includes steps 200 through 206. These steps are assumed to be performed by the SCHW 104 and RSS server 106 utilizing the remote service emulation logic 140 and remote service provisioning logic 160. The process begins with step 200, receiving, at SCHW (e.g., SCHW 104-1) from a host OS of a client device (e.g., client device 102-1), a discovery request. The SCHW is configured for coupling with the client device, such as over one or more fabric connections (e.g., fabric connection 103-1). The fabric connections may comprise at least one of a USB fabric connection and a PCIe fabric connection. The SCHW may be internally coupled to the client device as an embedded component of the client device, or may be externally coupled to the client device as an external pluggable device. The SCHW has a process and memory space executing a standalone OS separate from the host OS of the client device. The SCHW may comprise at least one of an SBC, COM, SOM, embedded computer system, SoC, SiP, integrated circuit and hardware accelerator.

In step 202, one or more emulation modules running on the SCHW are identified, the one or more emulation modules emulating one or more physical hardware devices configured for attachment to the client device. In some embodiments, the one or more emulation modules are implemented utilizing at least one of software containers, VMs, and microservices. In step 204, a response to the discovery request is provided from the SCHW to the client device. The response indicates a set of capabilities associated with the emulated one or more physical hardware devices. In step 206, one or more services are provisioned to the client device from the SCHW. Such provisioning includes performing processing of the one or more services utilizing hardware resources of the SCHW, and providing results of such processing to the client device via the emulated one or more physical hardware devices. At least a portion of the processing of the one or more services may be offloaded from the SCHW to a computing site (e.g., an edge computing site, a cloud computing platform, etc.) remote from the SCHW and the client device.

In some embodiments, the SCHW comprises a physical shut-off switch configured to turn off the SCHW independent of the client device. The SCHW may be further configured to detect one or more designated patterns of activity of the one or more emulation modules and, responsive to detecting the one or more designated patterns of activity, to provide a notification to the client device recommending actuation of the physical shut-off switch of the SCHW. The SCHW may also or alternatively be configured, responsive to detecting a first one of the one or more designated patterns of activity, to provide the notification to the client device recommending actuation of the physical shut-off switch of the SCHW and, responsive to detecting a second one of the one or more designated patterns of activity, to initiate an automatic shut-off of the SCHW.

Figure 2:
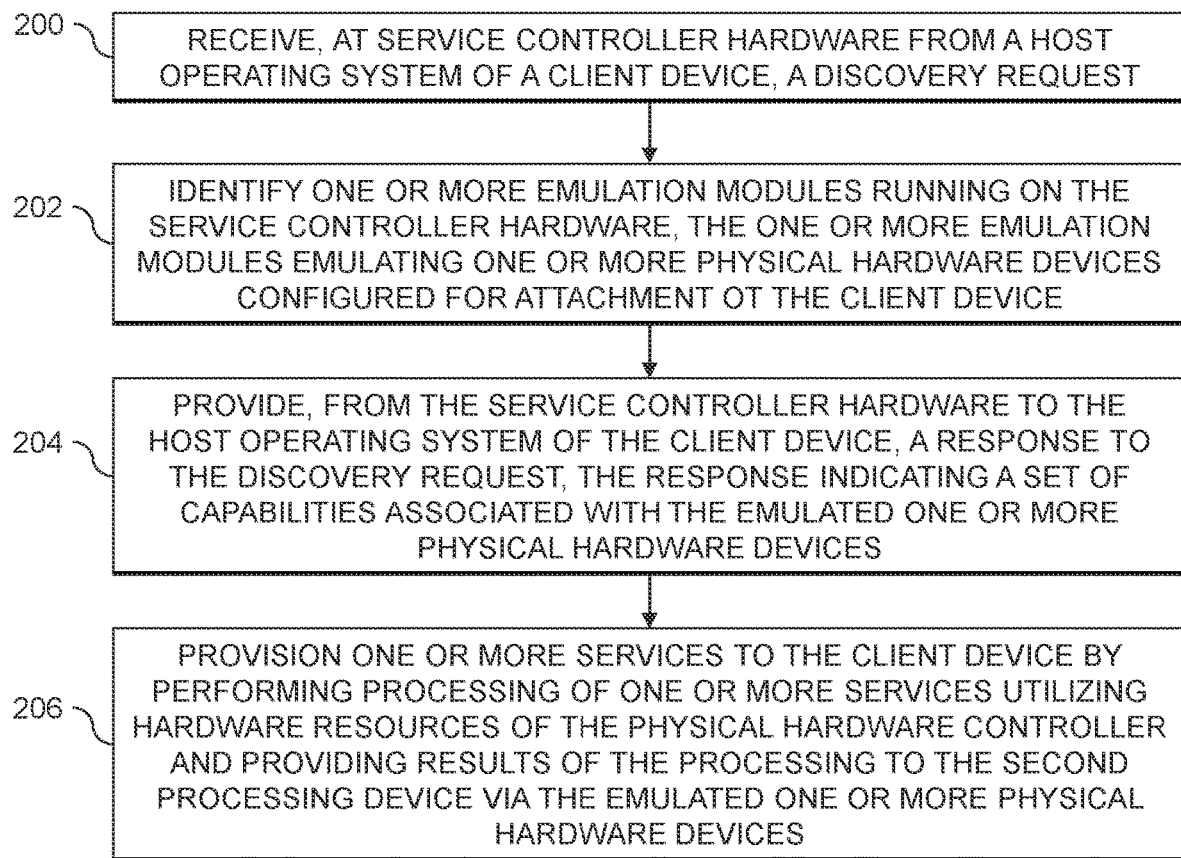
FIG. 2 is a flow diagram of an exemplary process for provisioning services on client devices using physical hardware controllers attached thereto in an illustrative embodiment.

The FIG. 2 process may further include the SCHW obtaining a device identifier of the client device (e.g., that it is connected to), utilizing the obtained device identifier of the second processing device to determine the one or more services attached to the client device, and executing the one or more emulation modules used for provisioning of the one or more services attached to the client device. The one or more services may be determined using an RSS server (e.g., RSS server 106), the one or more emulation modules being downloaded to the SCHW from the RSS server. At least one of the one or more services attached to the client device may be attached to one or more additional client devices, the client device and the one or more additional client devices comprising respective client devices associated with at least one of: a same user; and two or more users in a same level of an organizational hierarchy of an enterprise.

Illustrative embodiments provide technical solutions for providing system-level services that appear to a host (e.g., a client device) as physically attached "hardware" (e.g., peripheral components that are internal to the client device or which are externally pluggable or otherwise physically attached thereto). The technical solutions described herein include hardware and software designs for enabling users to remotely provision and attach various software-defined system-level services on client devices. As noted above, the software-defined system-level services are configured to appear to the client devices as physically attached hardware through emulation. In this way, a host OS running on a client device can communicate with the emulated hardware (e.g., providing provisioned software-defined system-level services) using standard drivers of the host OS. Advantageously, the client device is enabled to utilize custom software-defined system-level services without requiring any additional custom software to be installed in or by the host OS (only the standard drivers of the host OS are required). Various types of software-defined system-level services may be provided using the technical solutions described herein, including but not limited to storage services, multimedia services, security or network services, etc.

Various client devices, such as laptops, desktops, etc., are installed with an operating system (e.g., a host OS), where software-defined services are controlled by the host OS. These services are varied, and may include services for network attached storage, rich multimedia services, etc. The host OS may include a large number of different services (e.g., hundreds of services), and such services collaborate with each other to run various software on the hardware of the client device. Not all services are the same, however, and each service may have its own goals and characteristics. Some of the services deal with input/output (I/O) requests, and often block or consume significant processing (e.g., central processing unit (CPU)) resources of the client device for that reason. In many client devices, the CPU (or other processor) is the most precious resource of the machine, and thus various hardware is designed to take best advantage of the CPU. With the CPU being blocked, the efficiency of hardware and the ultimate user experience of the client device is at risk. It should be noted that the critical or limiting resources of a client device are not limited solely to CPU or other processing resources. Other types of hardware resources, such as memory resources, storage resources, network resources, etc., may be limiting factors and play a role in the performance of applications or other software running on a client device.

The technical solutions described herein provide mechanisms for offloading system services of a client device to one or more additional, separate devices. The separate device is implemented as a locally attached controller, which may be an embedded component of the client device such as an internal peripheral component of the client device, an external pluggable device or peripheral component, etc. The offloaded services may be run directly on such separate devices, the separate devices may themselves offload the services to a remote computing site (e.g., an edge computing site, a cloud computing platform, etc.), or combinations thereof. The offloaded system services may include services with high resource consumption, with the additional separate devices being more efficient at processing such services so that resources can be freed up on the client device to contribute more efficiently to other services running on the client device (e.g., which may impact performance or account for user experience thereof).

The technical solutions described herein overcome various technical problems associated with conventional approaches. Such technical problems include that system-level services can consume significant resources on a host or client device. Various system-level services, including but not limited to multimedia services, network attached storage, etc., may consume significant amounts of resources including but not limited to compute cycles, memory space, etc. of a host or client device. As an example, the Data Plane Development Kit (DPDK) is an open-source framework that brings network packet processing from a system domain to a user domain to take advantage of multiple-core CPUs. DPDK, however, provides software that brings complexity to the host or client device on which it runs, due to the installation of and requirement for new components. Illustrative embodiments provide technical solutions that enable the resources consumed by such services to be offloaded, such that the host or client device does not need to provide extra resources for them.

Another technical problem with conventional approaches is that re-installation of a host OS on a client device will remove all system-level services (e.g., which are not bundled with the host OS installation). Re-installation of the host OS removes all the services that a user has installed on the OS, forcing the user to manually reinstall all services that are needed. Further, most software and services require some configuration before use. Re-installation of the host OS will discard configurations of existing services and software. In some cases, it can be very difficult and time-consuming to re-configure software and services following re-installation of the host OS, which discards the configurations of existing services. As an example, Network File System (NFS) is a network filesystem that needs to be configured with an IP address of the NFS server, a device or folder on the NFS server, a username and password, a version of NFS, a target format of the filesystem, a target mount path, a target permission type, etc. While it may not be very difficult to configure (or reconfigure) an NFS client, remembering to do so presents a technical problem since a user may forget that such configuration needs to be performed on re-installation of the host OS (e.g., as such configuration only needs to be done once). In other words, users would notice the absence of NFS-mounted folders only when they attempt to use them, at which point the user would need to find the appropriate configuration details and manually configure the NFS client. This leads to another technical problem of keeping track of the configuration itself. A user would need to find a place to store the configuration information, and may further need to consider the security of the configuration information if it contains sensitive credentials.

Further, there may be various technical problems associated with using services on a new machine or device, as this requires configuration of services on that new device. With the advent of advanced communication networks and protocols, such as 5G and edge computing, new use case scenarios are contemplated. Consider, as an example, that various facilities (e.g., coffee shops, offices, airports, etc.) may provide multimedia terminals or devices for use. Thus, a user would not necessarily need to bring their own device (e.g., a laptop) to work in a new facility. Configuring such multimedia terminals or devices in different facilities to bridge desired services thereto (e.g., from a user's "home" laptop or other device) may require significant manual effort, particularly as the user would need to do so repeatedly at multiple facilities or locations.

Conventional approaches also suffer from technical problems in that it is difficult to manage and control services that run on multiple host or client devices, with hardware configuration (e.g., size of storage) being particularly difficult. Typically, such management requires remote log-in. For example, if an NFS server is upgraded with a new configuration, then all clients of that NFS server would need to be reconfigured (e.g., as the mounting parameters would be different). Thus, an operator (e.g., IT support staff) or each user of the devices running the NFS clients would need to login to the devices and re-mount remote folders with the updated configuration. For an NFS server with thousands of clients, for example, this would require significant manual effort. The technical solutions described herein enable a control plane across multiple devices which can significantly reduce such manual effort.

Additional technical problems include that services affiliation to certain types of OSes makes it hard for a user to change platforms. For example, it is common that a legacy service may be developed for only one OS platform (e.g., Windows, Linux, etc.). In some cases, even the version of a given platform would matter (e.g., a service may only function correctly on a particular version of an OS platform, such as a particular version of a Linux distribution, etc.). This can potentially delay or even block upgrading and security updates for a current platform.

The technical solutions described herein provide mechanisms for embedding or attaching physical SCHW in client devices, and further provide a design for Service Controller Software (SC S) running within the SCHW as well as RSS which may run remote from the client device in which the SCHW is embedded or attached. In some embodiments, the RSS runs on a remote computing site, such as an edge computing site, a cloud computing platform, etc.

The SCHW can be connected to a client device (also referred to as a host device or simply a host) via different fabrics. Such fabrics may include, but are not limited to, USB, PCIe and other high bandwidth and no or minimal latency fabrics. Based on the fabric that is utilized, a host OS driver for the SCHW will be implemented differently. In the description below, it is assumed that the fabric connecting the SCHW to the client device is USB. It should be appreciated, however, that various other fabrics may be utilized including but not limited to PCIe embedded SoC with a modified implementation. Such implementation differences and details will be called out and explained in the description below where necessary.

In some embodiments, a SCHW is implemented utilizing Smart Network Interface Card (SmartNIC) or other SoC technology. SmartNIC and SoC technology provide the SCHW with its own process and memory space, making the SCHW a mini-computer that is capable of executing its own OS in a standalone fashion. Although limited by computation power and storage, SmartNIC and other SoC devices can be suitably modified to act as a smart controller that is remotely orchestrated from a control plane (e.g., implemented on a cloud computing platform, an edge computing site or other standalone server, etc.) to provide SCHW functionalities. In some cases, the SCHW has a separate Network Interface Card (NIC). In other cases, the SCHW can share the NIC with the host OS (e.g., with SmartNIC technology).

Figure 3:
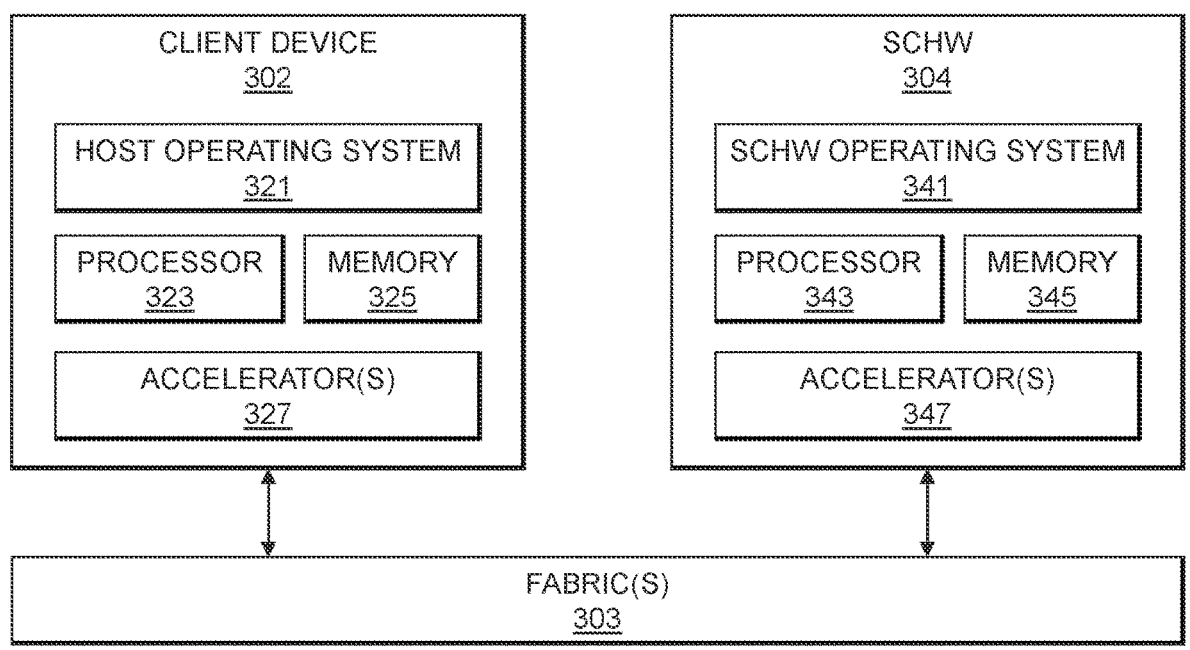
FIG. 3 shows a fabric connection between a client device and service controller hardware in an illustrative embodiment.

FIG. 3 illustrates connection between a client device 302 and SCHW 304. As shown, the client device 302 and SCHW 304 are connected via one or more fabrics 303 (e.g., USB, PCIe, etc.). The client device 302 has a host OS 321, as well as one or more processors 323, one or more memories 325, and one or more accelerators 327. Similarly, the SCHW 304 has a SCHW OS 341, one or more processors 343, one or more memories 345, and one or more accelerators 347. Although the client device 302 and SCHW 304 are connected through a physical fabric 303, the client device 302 and SCHW 304 cannot communicate with one another without use of SCS implemented on the SCHW 304.

The SCS running on SCHW 304 includes the SCHW OS 341. Depending on the architecture of the SCHW 304 (e.g., ARM, x86, etc.), the implementation of the SCHW OS 341 would be different. In the description below, it is assumed that the SCHW OS 341 is a distribution of Linux, but this is not a requirement. The SCHW 304 will emulate as a physical device that the host OS 321 can consume by using standard drivers. With this design, no additional software needs to be installed on the host OS 321. All remote system-level services will appear as physical (e.g., hardware) functions to the host OS 321.

Figure 4:
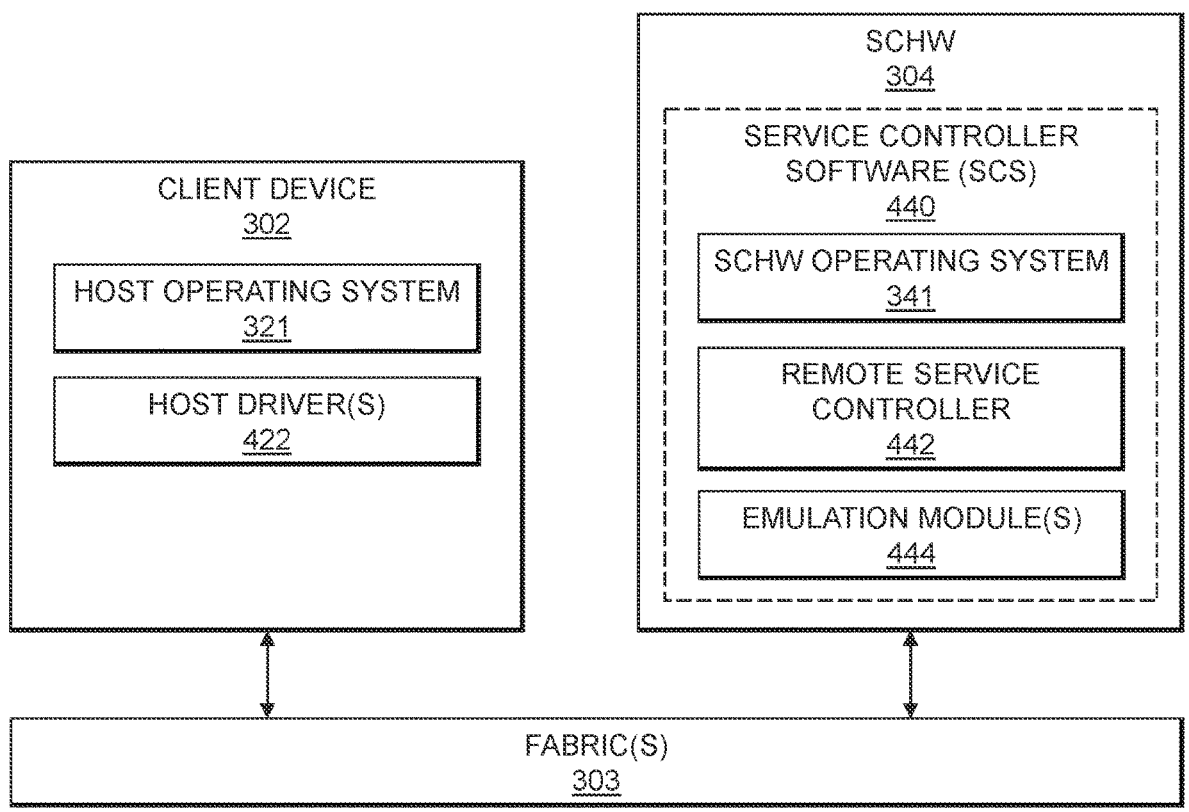
FIG. 4 shows communication between a client device and service controller software on service controller hardware in an illustrative embodiment.

FIG. 4 illustrates communication between the client device 302 and SCHW 304 as enabled via SCS 440, which includes the SCHW OS 341, a Remote Service Controller (RSC) 442, and one or more emulation modules 444. The SCHW OS 341 is capable of running different processes, like any other OS, as well as containers (e.g., with cgroups functionality) and VMs (e.g., with hypervisor functionality). In some embodiments, the SCHW OS 341 is locked down so that no user (e.g., of the client device 302) is able to log in. This prevents users (and potentially intruders or other malicious actors) from manipulating the information and processes stored on the SCHW 304. The software executing on the SCHW OS 341 may be orchestrated remotely.

Within the SCHW OS 341, software runs to orchestrate different ones of the emulation modules 444. Depending on the services selected by a user remotely (e.g., as described in further detail below with respect to FIG. 5), the RSC 442 will download corresponding software for execution in SCS 440. When the host OS 321 attempts to discover what SCHW 304 is capable of, it will send a signal expecting the SCHW 304 "device" to answer back with its capabilities in a format defined by the standards of the fabrics 303 utilized for interconnecting the client device 302 and the SCHW 304. Both USB and PCIe fabrics, for example, have established standards of communication. When the signal is received by the SCHW 304, depending on which emulation modules 444 are running, it will respond differently. Based on the response received from the SCHW 304, the host OS 321 will register the SCHW 304 as correspondent physical devices and utilize host drivers 422 for communicating with the emulated physical devices. For example, if the host OS 321 is Linux, it will create new files, representing the physical devices emulated via the emulation modules 444, inside the "/dev" folder. The major difference from other files in the "/dev" folder representing conventional physical devices, is that commands from the host OS 321 will be sent to the emulation modules 444 instead of physically attached devices. As an example, one of the emulation modules 444 may emulate mass storage utilizing USB On-The-Go (OTG) standards similar to how an Android phone appears as USB mass storage when plugged into a personal computer (PC).

The orchestration of the emulation modules 444 may be achieved via different mechanisms, including but not limited to processes, containers, VMs, microservices, etc. Microservices design allows for each of the emulation modules 444 to be orchestrated independently. Lifecycle and version updates for each of the emulation modules 444 would then not interfere with one another.

Figure 5:
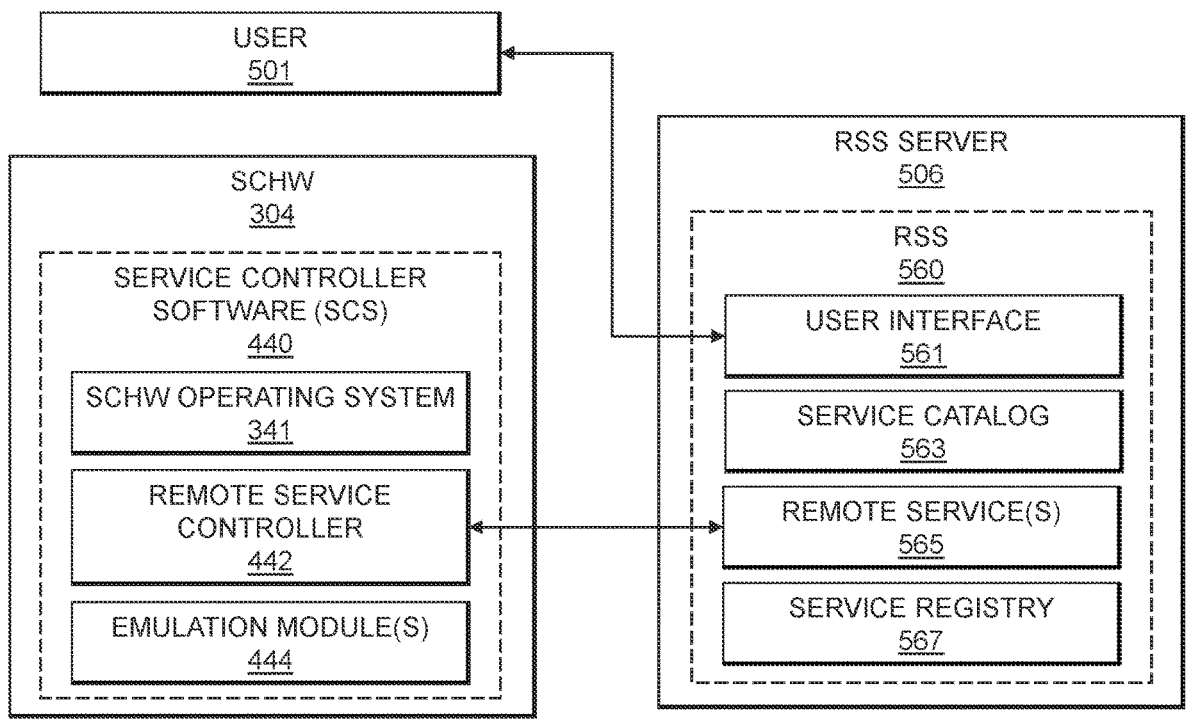
FIG. 5 shows a control plane for remote software services enabled utilizing service controller software of service controller hardware in an illustrative embodiment.
Figure 6:
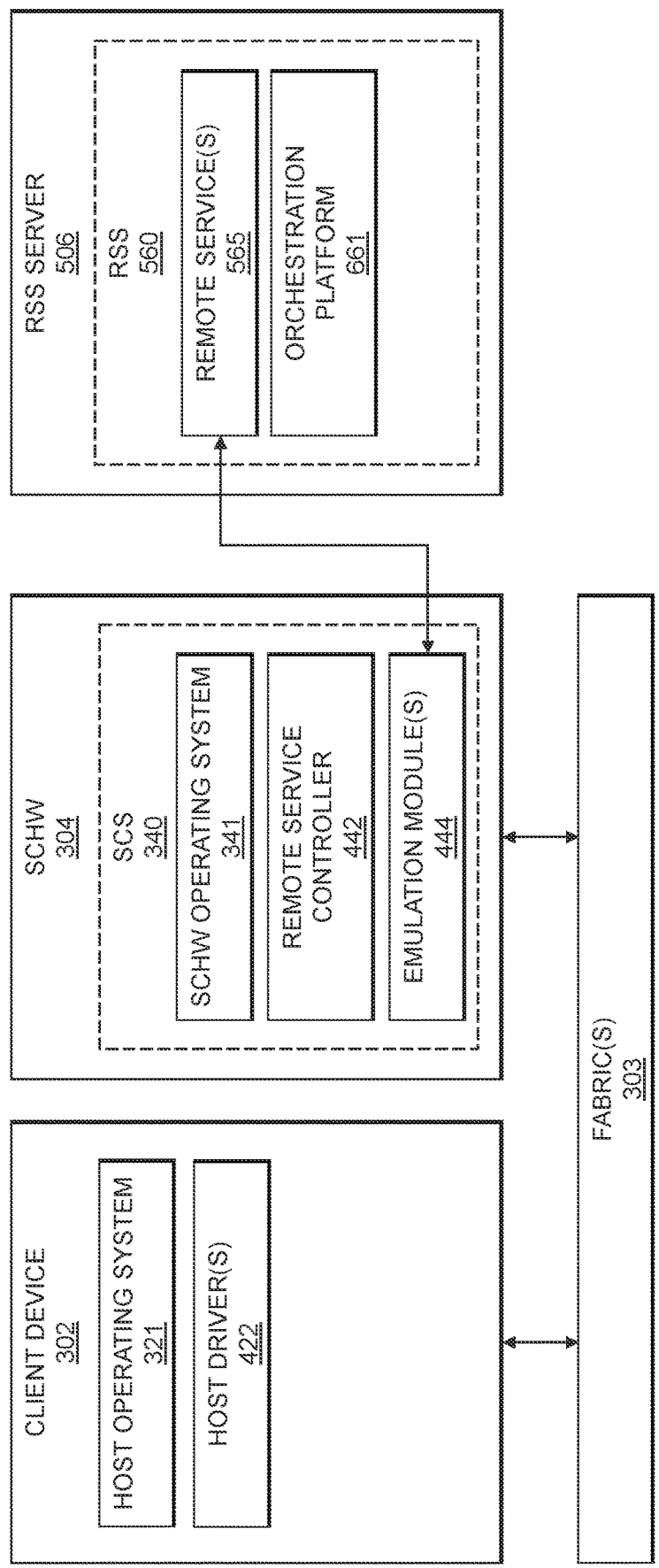
FIG. 6 shows a data plane between remote software services and service controller hardware in an illustrative embodiment.

The SCS 440 responds to the host OS 321 on the client device 302 with its capabilities (e.g., of the "hardware" emulated by the emulation modules 444). In order to perform its functionality, the SCS 440 will gain remote access to RSS 560 operating on an RSS server 506 as illustrated in FIGS. 5 and 6. The RSS 560 implemented by the RSS server 506 provides both control plane and data plane software functionalities, with FIG. 5 illustrating the control plane functionalities and FIG. 6 illustrating the data plane functionalities.

The control plane functionalities of the RSS 560 include providing a user interface 561 that enables a user 501 to create a profile and log in to provision services, selected from a service catalog 563, as remote services 565 attached to their client devices (e.g., the client device 302 via the RSC 442 of SCS 440 running on SCHW 304 attached thereto via fabrics 303). The service catalog 563 provides a catalog of registered services, while the service registry 567 stores associated emulation modules. The profile enables the user 501 to quickly and easily retrieve their settings if they change devices in the future. The SCHW 304 can also be controlled remotely by the RSS 560 to manage lifecycle and version updates of emulation modules 444 executing within the SCHW 304.

As shown in FIG. 6, the emulation modules 444 connect with the RSS 560 remotely and establish a data path via orchestration platform 661, thereby bridging the client device 302, the SCHW 304 and the RSS 560 operating on the RSS server 506. The orchestration platform 661 may be used for provisioning remote services 565 to the emulation modules 444. When the host OS 321 sends a request to one of the emulation modules 444, the remote services 565 that are related to that one of the emulation modules 444 will be scheduled to run by the orchestration platform 661 of the RSS 560.

If the SCHW 304 loses access to the RSS 560, this can be handled in several ways depending on the implementation. For example, some embodiments may utilize a caching mechanism that enables recently and/or commonly completed actions to continue if the SCHW 304 goes offline (e.g., loses connectivity to the RSS server 506 implementing RSS 560). In other embodiments, a machine learning (ML) model may be implemented that learns from common types of decisions and continues those until connectivity is restored. The user 501 can also preconfigure settings for when connectivity is lost.

Functionality of the SCS 440 and RSS 560 will now be described in further detail. In order for any service to show up on RSS 560, service providers would first register their services in the service catalog 563, along with associated emulation modules in the service registry 567. The service catalog 563 may utilize a predefined application programming interface (API) so that developers can control how their services would appear to the users with service descriptions. In some embodiments, the service catalog 563 implements an Open Service Broker API for this purpose. The developer would also need to upload their remote services (e.g., as remote services 565) and associated emulation modules (e.g., in service registry 567). The remote services 565 are the core components fulfilling some desired functionality (e.g., business value), while the associated emulation modules 444 translate host OS commands (e.g., from host OS 321) into requests that the remote services 565 can handle. In some embodiments, containerization or virtualization technologies are utilized to standardize the execution environment for the emulation modules 444 and remote services 565. To summarize, a developer would need to upload a service description (e.g., that is made part of the service catalog 563), a remote service (e.g., provided as one of remote services 565), and an emulation module (e.g., that is stored in the service registry 567). Service providers can repeat such steps for each version available for any of the three artifacts (e.g., service description, remote service and emulation module).

Registration of client devices, such as client device 302, will now be described. When a user obtains a new client device (e.g., a laptop, desktop, etc.), a unique device identifier is created to identify that client device. In some embodiments, the unique device identifier is in a universally unique identifier (UUID) format. The unique device identifier enables the user to register the new client device through the user interface 561 of the RSS 560. It should be noted that a user may have multiple client devices registered with the RSS 560. The client devices registered with the RSS 560 may be organized into groups and hierarchies, such as in an enterprise organizational structure, for ease of management.

Figure 7:
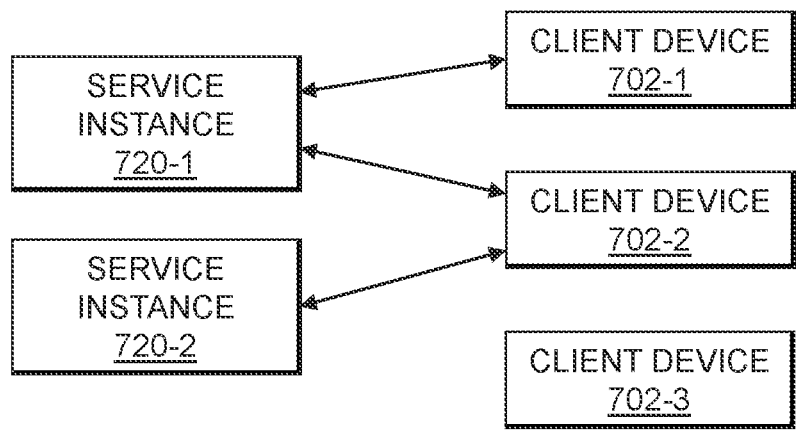
FIG. 7 shows service provisioning and attachment to different client devices in an illustrative embodiment.

Service provisioning and attachment will now be described. The user 501 can log into RSS 560 and provision service instances from the user interface 561. Once a service instance is provisioned, the user 501 can then attach that service to one or more of their client devices (e.g., attaching remote services 565 to the RSC 442 of the SCS 440 running on the SCHW 304). Some services can only be attached to one client device at a time, while other services can be attached to multiple client devices concurrently. In a similar manner, the remote services 565 can also be detached and deprovisioned (e.g., from the RSC 442 of the SCS 440 running on SCHW 304). FIG. 7 illustrates attachment of service instances 720-1 and 720-2 to a set of client devices 702-1, 702-2 and 702-3. In this example, the service instance 720-1 is attached to client devices 702-1 and 702-2, and the service instance 720-2 is attached to the client device 702-2. Client device 702-3 is an example of a client device that is registered with RSS 560 but which has no service instances currently attached thereto. As described elsewhere herein, service instances may be attached to and detached from different client devices as desired. Such attachment and detachment of service instances to or from client devices may occur, for example, in conjunction with moving a particular service instance between two client devices registered to a same user, adding new service instances to one or more client devices, removing existing service instances from one or more client devices, and in numerous other scenarios.

Installation of emulation modules will now be described. As the user 501 turns on their client devices (e.g., client device 302) any associated SCHW devices (e.g., SCHW 304) connected thereto may also be turned on. After the SCS 440 is booted on the SCHW 304, for example, the RSC 442 will connect with RSS 560 (e.g., utilizing the unique device identifier of the client device 302) to determine if any remote services 565 should be attached. If a new service instance is attached, the RSC 442 will download the corresponding emulation module from the service registry 567. That emulation module would then be executed as one of the emulation modules 444 on the SCS 440 of SCHW 304. When the user 501 detaches and deprovisions a service instance, the associated one of the emulation modules 444 would be shut down and deleted from SCS 440 in a similar fashion.

When the client device 302 boots up or turns on, the host OS 321 will obtain device information from the SCHW 304 as described above to determine which driver or drivers it can use to communicate with and utilize the SCHW 304. Based on the emulation modules 444 running on the SCHW 304, the host OS 321 will "think" that the SCHW 304 is one or more physically attached devices that the emulation modules 444 are emulating. The host OS 321 will then utilize standard drivers for communication with such physically attached devices being emulated by the emulation modules 444. The remote services 565 for the emulation modules 444 will also be orchestrated via the orchestration platform 661 where the RSS server 506 is running (e.g., at an edge computing site, a cloud computing environment, etc.). The host OS 321, as described above, communicates with the SCS 440 by standard drivers through the fabric 303. The corresponding emulation modules 444 running on the SCS 440 will process the signals, send corresponding requests to the remote services 565, and respond back to the host OS 321 with results from the remote services 565. It should be noted that this is not limited to a single round process—communication among the host OS 321, the emulation modules 444 and remote services 565 may involve multiple communication rounds that are processed continuously or as-needed to provide desired functionality.

In some embodiments, the SCHW 304 implements a physical switch that enables the SCHW 304 to be turned off (e.g., independent of the client device 302 it is attached to). While the SCHW 304 can provide many new capabilities, it also provides another runtime environment that is out of reach of the users of the client device 302. When users do not wish to utilize the capabilities of the SCHW 304, the physical switch may be actuated to turn off the SCHW 304. Actuation of the physical shut-off switch may notify the SCHW 304 to turn into a hibernation mode, or to turn off completely after draining or completing any pending execution. Where the SCHW 304 is implemented as an external device (e.g., outside of the housing of the client device 302), the SCHW 304 may be simply unplugged and thus does not require a physical switch that allows a user of the client device 302 to temporarily disable or shutdown the SCHW 304. In some embodiments, the RSC 442 of the SCS 440 is configured to detect the occurrence of unusual (e.g., suspicious or potentially malicious) activity patterns. On such detection, the RSC 442 may prompt or notify a user of the client device 302 that such activity patterns are occurring and indicate that the SCHW 304 should be physically shut down. The RSC 442 may alternatively be configured to automatically shut down the SCHW 304 on detecting such activity patterns. In some embodiments, the RSC 442 may choose whether to send a notification to the user of the client device 302 or automatically initiate shutdown of the SCHW 304 based on the particular type of activity pattern that is detected, based on determining a riskiness of the particular type of activity pattern that is detected, etc.

SCHW devices (e.g., SCHW 304) provide various technical solutions and advantages, including remote provisioning of system-level services for client devices (e.g., client device 302). The SCHW technology provides separate hardware with its own OS (e.g., the SCHW OS 341) that provides a service controller (e.g., RSC 442) enabling remote system-level services (e.g., remote services 565) for the client device it is connected to. SCHW can leverage SmartNIC and emulator technologies, enabling remote system-level services for client devices. Such remotely provisioned system-level services, selectable by users of the client devices (e.g., or an administrator or IT staff that manages devices on behalf of an enterprise), will appear as physical hardware functionalities to the host OS of a client device, and are supported by standard drivers of the host OS. Further, the remotely provisioned system-level services will persist throughout reinstallation of host OSes on client devices. Illustrative embodiments also provide for collaborative software orchestration across clients, edge computing sites and cloud computing sites for provisioning of remote system-level services to users in a collaborative manner. Based on user selection, the capabilities of the client devices will dynamically change and can be remotely managed by users.

The technical solutions described herein can also advantageously improve end-user experience, particularly for users of client devices with limited hardware resources, by offloading resource-intensive processes (e.g., I/O-heavy processes) from a client device to its attached SCHW (and potentially from the SCHW to a remote computing site, such as an edge computing site, a cloud computing platform, etc.). In a typical client device, the clock speed of the CPU is generally much faster than other components and it provides one of the most critical resources for the client device. Taking full advantage of CPU resources not only improves the user experience, but also increases the cost efficiency. Due to the different level of clock speed of the CPU as compared to other components (e.g., I/O devices, storage, network, etc.), the CPU of a client device will have to block itself to wait for the input from such other components. This can dramatically slow down the CPU. Also, in certain platforms the CPU needs to constantly engage itself in processing the data transferring from one location to another location. This could be done with other computational processing units with much lower cost. Being able to detect such processes and offload them from a client device to its attached SCHW would allow the CPU of the client device to focus on other processes that it is more efficient at.

The RSS (e.g., RSS 560) also provides various advantages through enabling a marketplace for services that can be presented as "hardware" to a host OS via emulation modules (e.g., emulation modules 444) running on SCS (e.g., SCS 440). The RSS enables services to be published by one user (or other entity) and consumed by others. Further, the RSS makes it easier for operators to manage services across a group of devices (e.g., a group of client devices associated with a same user, a group of client devices that are operated by or under the control of an enterprise, etc.).

As described above, the SCHW may also be provisioned with a physical switch or other shutoff mechanism that enables a user of its attached client device to disable use of the SCHW (e.g., when SCHW is not needed, in response to detecting abnormal, suspicious or potentially malicious activity, etc.). The user is thus able to choose when to switch the SCHW on and off. In some embodiments, the user may be prompted to actuate the SCHW switch to turn off the SCHW if certain types of activity are detected, the SCHW switch may be preconfigured to turn the SCHW off automatically if certain types of activity are detected, etc.

The SCHW also enables orchestration to continue if connections are lost. For example, services may continue to be offloaded to the SCHW from a client device even if connectivity with a remote controller (e.g., the RSS server) is lost. This may be achieved by preconfiguring settings, using insights from historical data, caching recent decisions, etc.

Through leveraging the SCHW technology described herein, an organization can provide differentiation for its client devices while also enabling additional revenue streams from cloud and edge services. The SCHW technology also empowers the organization to become a service broker by setting up the service catalog on the RSS server. As a further technical advantage, the SCHW technology provides a control point for an organization into the client devices that it manages, where this control point can advantageously persist regardless of the host OS installed on the client devices. This enables the organization to provide more differentiating software-defined services, including but not limited to dynamic storage, multimedia services, remote computational acceleration, etc.

Figure 8:
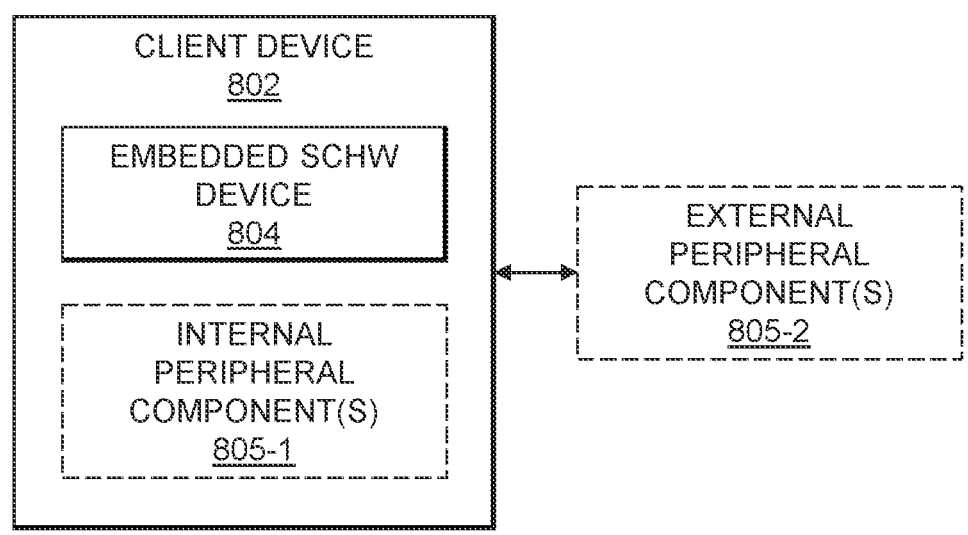
FIG. 8 shows a client device with an embedded service controller hardware device and peripheral components in an illustrative embodiment.

As noted above, an SCHW device may be implemented as either an embedded component within a client device, or as an external pluggable device. When implemented as an embedded component, the client device may be shipped to customers or other end-users with the SCHW device and SCS functionality pre-installed. The user can configure the services to be used on that client device via the RSS, and have services orchestrated thereto in an automated fashion. FIG. 8 shows an example of a client device 802 with an embedded SCHW device 804. The embedded SCHW device 804 may be connected to various internal peripheral components 805-1 of the client device 802 and/or external peripheral components 805-2 connected to the client device 802. The internal peripheral components 805-1 and external peripheral components 805-2 (collectively, peripheral components 805) may comprise various hardware, such as webcams or other cameras, microphones, mass storage devices, etc. It should also be noted that the embedded SCHW device 804 may be physically embodied as one of the internal peripheral components 805-1 (e.g., a PCIe component card, a USB device connected to an internal USB port of the client device 802, etc.). In some embodiments, some or all of the processing performed by or utilizing input from the peripheral components 805 is offloaded to the embedded SCHW device 804 (e.g., from a CPU or other processor of the client device 802 to a CPU or other processor of the embedded SCHW device 804, to a remote computing site such as an edge computing site, a cloud computing platform, etc.). As an example, one or more of the peripheral components 805 may comprise multimedia devices, with the embedded SCHW device 804 itself emulating as a hardware multimedia device to the client device 802 and performing various processing on audio and/or video that is captured by the multimedia device before is presented to the client device 802. Consider, as an example, audiovisual output of peripheral components 805, which may conventionally be processed in various ways (e.g., performing text-to-speech or audio translation, adding virtual backgrounds to video, combining video and/or audio sources, compressing audio and/or video, upscaling or transcoding audio and/or video, etc.) by the client device 802. Using the embedded SCHW device 804, such processing may be offloaded from the client device 802, freeing up resources of the client device 802 for other tasks.

Figure 9:
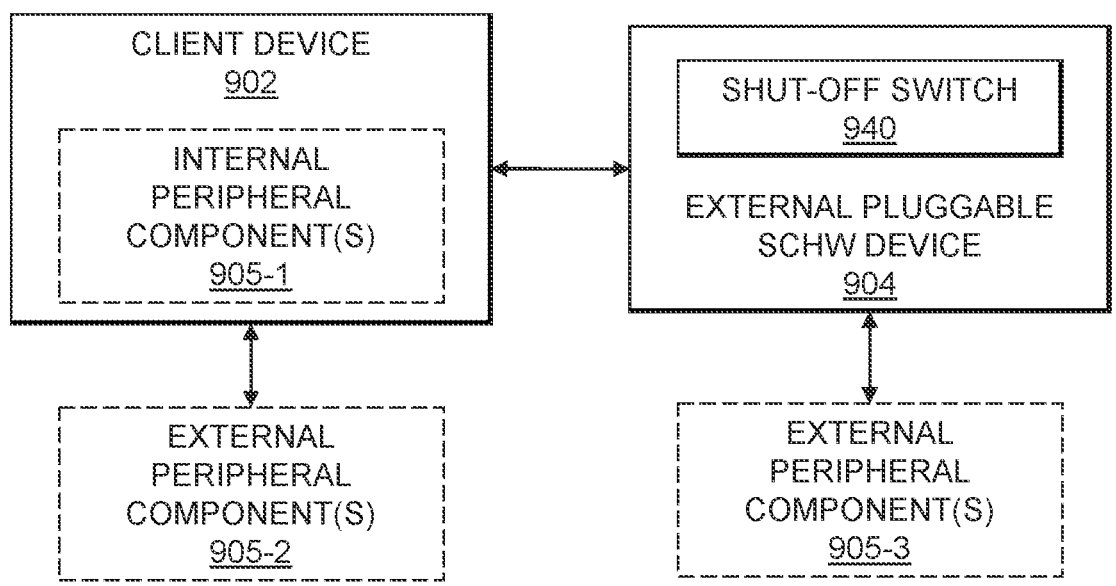
FIG. 9 shows a client device connected to an external pluggable service controller hardware device and peripheral components in an illustrative embodiment.

When implemented as an external pluggable device, the SCHW device may ship separately from client devices. The SCHW device can then be plugged into any client device (e.g., any computer) regardless of manufacturer, OS, etc. Once plugged in and configured, the SCHW device will provide the system-level services supported by the RSS server. FIG. 9 shows an example of a client device 902 connected to an external pluggable SCHW device 904. Here, peripheral components may be connected either directly to the client device 902 as internal peripheral components 905-1 or external peripheral components 905-2, or via the external pluggable SCHW device 904 as external peripheral components 905-3. The internal peripheral components 905-1, external peripheral components 905-2, and external peripheral components 905-3 are collectively referred to as peripheral components 905. The peripheral components 905 may be presented to the client device 902 as hardware "devices" via emulation modules running on the external pluggable SCHW device 904 in a manner similar to that described above with respect to FIG. 8 and elsewhere herein. The external pluggable SCHW device 904 may take on various form factors, such as using Raspberry Pi® hardware that is connected via a USB cable to a USB port of the client device 902 (e.g., a laptop). The USB cable connection between the external pluggable SCHW device 904 and the client device 902 may utilize USB-OTG. The external peripheral components 905-3 may include a USB microphone and USB webcam that are connected directly to USB ports of the external pluggable SCHW device 904. The external pluggable SCHW device 904 also includes a physical shut-off switch 940, configured to enable a user thereof to power on and off the external pluggable SCHW device 904 independent of the client device 902 that it is attached to. Although not explicitly shown in FIG. 8, the embedded SCHW device 804 may also comprise a physical shut-off switch.

Network attached storage may be deployed in various operating environments, including but not limited to data centers, offices, smart homes, etc. Cloud computing platforms may also be used for providing network attached storage or other types of remote storage services. To use network attached storage or another type of remote storage service, the consumer or other end-user must configure their devices (e.g., host or client devices) particularly for that remote storage service, with that configuration generally being a one-time effort and static. Re-installation or upgrading a host OS of a client device may require the user to manually reconfigure remote storage services again.

The technical solutions described herein provide a hardware and software stack that can provide storage emulation, making remote storage services available to client devices (e.g., client devices 102, client device 302) at a hardware level. Further, the technical solutions described herein allow a user or a provider of remote storage services to be able to control the remote storage services attached to different client devices from a remote portal (e.g., on an RSS server such as RSS server 106, RSS server 506). Advantageously, the use of remote storage services (e.g., cloud-based remote storage services) enables users to gain access to a virtually unlimited amount of storage media and storage space on their associated client devices. Using SCHW as described herein, such remote storage services may be provisioned to client devices without requiring installation of any additional software on a host OS of a client device. The host OS of the client device can use its own standard drivers for mounting emulated physical hardware storage devices used to provision such remote storage services. The technical solutions described herein also advantageously empower administrators and users to manage multiple remote storage services and multiple client devices with ease, overcoming technical problems associated with the complexity of managing client devices with multiple OSes and execution environments.

In conventional approaches, storage for client devices is typically restricted by physical storage media (e.g., internal or external). When storage space runs out, the user of a client device would have to purchase additional storage media. As another option, the user of the client device may utilize software-defined storage that is remotely attached on the host OS of the client device. Such software-defined storage solutions, however, need to be re-installed after re-installation or upgrade of the host OS, and need to be manually configured.

Some client devices may be configured with a multi-boot environment with multiple host OS installations. For each host OS on a client device, a partition of a physical storage drive is created to install that host OS. Alternatively, different storage drives (e.g., additional hardware) may be purchased and used for each host OS. It is difficult to manage multiple physical drives or partitions thereof, as they take up space and require physical user interaction. Other client devices may have only a single host OS (or relatively few host OSes) utilizing local storage. Many different applications may be installed under a single host OS. This type of setup has the potential for applications to interfere with one another, and may introduce additional overhead to the overall system with unnecessary background tasks and libraries.

Figure 10:
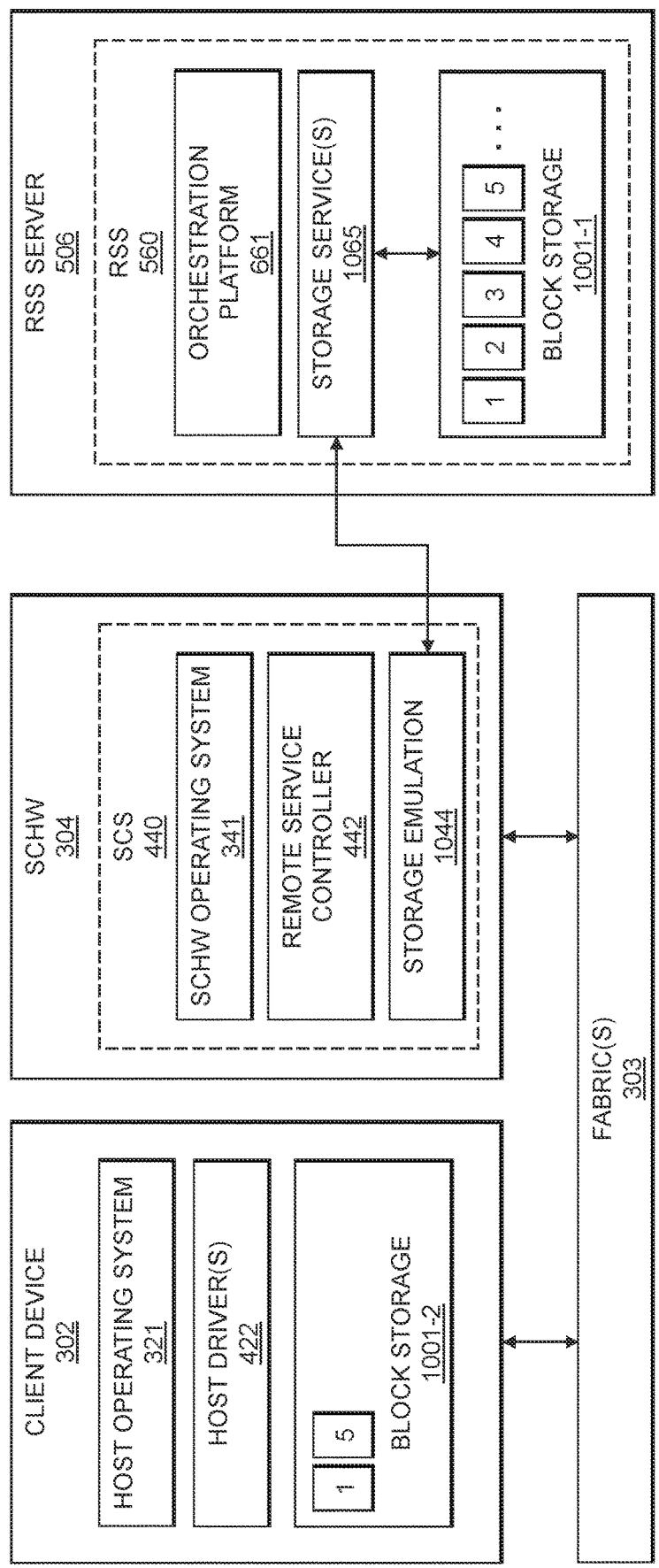
FIG. 10 shows a data plane between remote software services and service controller hardware for provisioning of storage services on a client device in an illustrative embodiment.

SCHW may be leveraged to offer remote storage services for client devices (e.g., laptops, desktops, etc.). SCHW, SCS and RSS components are used to remotely provision and manage storage services. FIG. 10 shows an architecture for provisioning remote storage services, including client device 302, SCHW 304 and RSS server 506 as described above. The RSS server 506 implements block storage 1001-1 including a set of block storage drives 1 through 5. The SCHW 304 running SCS 440 implements storage emulation modules 1044 that provision remote storage services 1065 running on the RSS 560 of RSS server 506 for the client device 302. In this example, the host OS 321 of the client device 302 utilizes its host drivers 422 (e.g., block storage drivers) to mount storage drives "1" and "5" of the block storage 1001-1 (e.g., that are provisioned through remote storage services 1065 on the RSS 560 of RSS server 506 via the storage emulation modules 1044 of the SCS 440) as block storage 1001-2.

Utilizing the user interface 561 of the RSS 560 on RSS server 506, developers of storage service providers can upload or otherwise create or publish a storage service description to list their storage service(s) on the service catalog 563. The user 501 can then utilize the user interface 561 (e.g., an RSS portal) to see available storage services in the service catalog 563. In the process of provisioning remote storage services 1065, the user 501 is able to specify the size of a storage service instance. Once the storage service instance is provisioned, the user 501 would then be able to attach that storage service instance to one of their registered client devices (e.g., client device 302).

The RSC 442 running on the SCS 440 of the SCHW 304 communicates with the remote services 565 (e.g., as illustrated in FIG. 5) to determine or detect if any storage service instances (or other service instances) are attached to the client device 302 that the SCHW 304 is currently connected to. If so, the RSC 442 will download associated storage emulation modules from the service registry 567 (if needed). The SCS 440 of the SCHW 304 will then execute such storage emulation modules as the storage emulation modules 1044 shown in FIG. 10, as orchestrated by the RSC 442. When the client device 302, via the host OS 321, signals over fabrics 303 to determine what type of functionality is provided by the SCHW 304, the SCHW 304 will respond with a set of capabilities including storage emulation. For example, if the host OS 321 is a Linux OS, the storage emulation modules 1044 will show as a file located at "/dev/sdx" where the value of "x" depends on how many storage devices are already attached to the host OS 321. When multiple storage service instances are attached to the client device 302, the SCHW 304 will respond to the discovery request with multiple storage capabilities. In FIG. 10, for example, the SCHW 304 would respond with two storage emulation modules 1044 (e.g., one for the block storage drive "1" and one for the block storage drive "5").

Based on the type of fabrics 303 used, the storage emulation modules 1044 may be implemented differently. As an example, if the fabrics 303 are implemented with USB, then the storage emulation modules 1044 may be implemented with USB OTG and the SCHW 304 will emulate as USB mass storage (e.g., it emulates a physical USB mass storage device that is configured for attachment to the client device 302). As another example, if the fabrics 303 are implemented with PCIe, then the storage emulation modules 1044 can emulate using solid-state drive (SSD) or non-volatile memory express (NVMe) technology and the SCHW 304 will emulate as SSD or NVMe devices (e.g., it emulates as physical SSD or NVMe devices that are configured for attachment to the client device 302). It should be noted that, depending on the implementation, the firmware of the SCHW 304 may be configured to provide a dynamic PCIe registry.

The remote storage services 1065 hosted in the RSS 560 of the RSS server 506 provide backend storage services that can be remotely attached to SCS 440 and made available to the host OS 321 of the client device 302 via the storage emulation modules 1044. When user 501 provisions a storage service instance from the service catalog 563 of the RSS 560, storage is allocated based on the size of storage specified by the user 501 via the user interface 561. Such storage may be allocated in a cloud-based block storage system as block storage 1001-1.

At runtime, the host OS 321 of the client device 302 makes storage requests via the fabrics 303 (e.g., using the host drivers 422 which would normally be used for communication with physically attached devices that the storage emulation modules 1044 are emulating). The storage emulation modules 1044 actively running on the SCS 440 of the SCHW 304 will receive the storage request signal(s), and make corresponding storage request(s) to the remote storage services 1065 running on the RSS 560 of the RSS server 506 to obtain blocks remotely from the block storage 1001-1.

Communicating with the remote storage services 1065 may take a relatively longer time than accessing local storage on the client device 302 (or on local storage of the SCHW 304). To mitigate this, some embodiments implement various caching mechanisms that utilize the memory 325 of the client device 302 (e.g., host RAM) and/or the memory 345 of the SCHW 304 (e.g., SCHW RAM), and/or actual physical storage devices (e.g., SSDs, NVMe, hard disk drives (HDDs), etc.) of the client device 302 or SCHW 304. Such caching mechanisms will advantageously reduce the amount of traffic between the SCHW 304 and the RSS server 506, and reduce the average latency. Various types of caching mechanisms may be used, such as Least Recently Used (LRU), Least Frequently Used (LFU), etc., which set aside chunks of spaces for caching purposes. More advanced caching mechanisms may also be used.

The remote storage services 1065 can be orchestrated via the orchestration platform 661 at the RSS server 506, which may be at a remote computing site relative to the client device 302 and SCHW 304 (e.g., the RSS server 506 may comprise or be part of an edge computing site, a cloud computing platform, etc.). As an example, an enterprise with a large office can offer remote storage services 1065 at a local cluster (e.g., a computing site that is co-located with the office or geographically close to the office) to reduce latency by using high-speed LAN or other networks. Users who value mobility can utilize high-speed edge services (e.g., such as telecom edge (Telco Edge) services) to offer higher storage access speed to mobile client devices (e.g., so that data does not need to be fetched and pushed all the way to a cloud computing platform for each I/O operation).

To deploy storage services via the RSS 560, developers of the storage service providers will deploy a storage service description (e.g., for entry into service catalog 563 of the RSS 560), a remote storage service (e.g., as one of remote services 565 of the RSS 560, shown in FIG. 10 as remote storage services 1065), and a storage emulation module (e.g., for entry into service registry 567 of the RSS 560). Registration of client devices such as client device 302 with the RSS 560 is described above. When a user 501 obtains a new client device (e.g., client device 302), a predefined unique device identifier will be used to identify that client device and register it with the RSS 560 via the user interface 561. The user 501 may have multiple associated client devices, and client devices may also be organized into groups and hierarchies (e.g., in accordance with an enterprise organizational structure) for ease of management.

Figure 11:
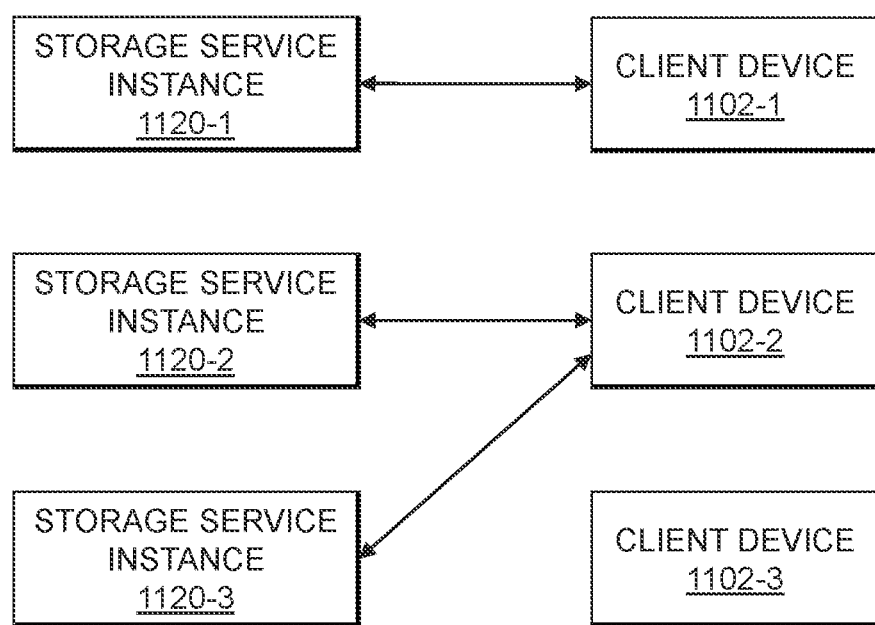
FIG. 11 shows storage service provisioning and attachment to different client devices in an illustrative embodiment.

To provision remote storage services 1065, the user 501 logs into the RSS 560 to provision storage service instances via the user interface 561. Once a storage service instance is provisioned, the user 501 can attach that storage service instance to a client device. In some embodiments, the storage services are block storage services, where each block storage service instance should be attached to no more than one client device at any particular time for consistency. This is illustrated in FIG. 11, showing multiple storage services instances 1120-1, 1120-2 and 1120-3 and their mappings or attachment to different client devices 1102-1, 1102-2 and 1102-3. In the FIG. 11 example, the storage service instance 1120-1 is attached to client device 1102-1, while storage service instances 1120-2 and 1120-3 are attached to client device 1102-2. Client device 1102-3 is an example of a client device that is registered with RSS 560 but which has no storage service instances currently attached thereto. As illustrated in FIG. 11, multiple storage service instances (e.g., storage service instances 1120-2 and 1120-3) can be attached to a single client device (e.g., client device 1102-2), though each storage service instance is attached to only one client device at a time. In a similar manner (e.g., via user interface 561 of the RSS 560), storage service instances can be detached from client devices and de-provisioned. Although in the FIG. 11 example each storage service instance can be attached to only one client device at a time (e.g., for block-based storage services to maintain consistency), in other embodiments a storage service instance may be attached concurrently to multiple client devices.

When the user turns on client device 302, the SCHW 304 may also be turned on (as described elsewhere herein, in some embodiments the SCHW 304 may be turned on and off independently of the client device 302 it is attached to). After SCS 440 is booted on the SCHW 304, the RSC 442 will connect with the RSS 560 on RSS server 506 using the unique device identifier of the client device 302 to determine if any remote services 565 (e.g., such as remote storage services 1065) are attached to the client device 302. If a new service instance is attached, the RSC 442 will download the corresponding emulation module from the service registry 567 of the RSS 560. That emulation module would then be executed on the SCS 440 (e.g., as emulation modules 444 or storage emulation modules 1044). When a user detaches a service instance (e.g., including a storage service instance) from the client device 302, the associated emulation modules running on the SCS 440 of the SCHW 304 will be shut down and deleted from the SCS 440. If the service instance being deprovisioned is a storage service instance, the storage may also be removed in the backend storage (e.g., block storage 1001-1), wiping the data clean and freeing up the storage space.

Storage that is emulated via the storage emulation modules 1044 running on the SCS 440 of SCHW 304 may be used as a boot media, as data storage, or both. Where the emulated storage is used as a boot media, the boot media can be selected from a boot screen or other interface of the client device 302. The Basic Input/Output System (BIOS) or other firmware of the client device 302 will obtain device information from the SCHW 304 to determine which of the host drivers 422 it can use to communicate with and utilize the emulated storage provided via storage emulation modules 1044 of the SCHW 304. Based on the storage emulation modules 1044 running on the SCS 440 of the SCHW 304, the host OS 321 of the client device 302 will "think" that a storage device is physically attached to the client device 302 via fabrics 303. The emulated storage will then show up as bootable media of the client device 302 at the boot screen or other interface. Depending on the fabrics 303 used to attach the SCHW 304 to the client device 302, the boot option for the emulated storage may show up in different places in the boot screen or other interface. For example, if the SCHW 304 is attached to the client device 302 via a USB fabric, then the emulated storage will show as USB mass storage in the boot media list.

As blocks (or other data) are requested by the client device 302 to boot up the host OS 321, the storage emulation modules 1044 will obtain such blocks (or other data) from the block storage 1001-1 via the remote storage services 1065 to proceed with the boot sequence. Various caching and pre-loading mechanisms can be used to further reduce the time for transmission of mission-critical blocks to speed up the boot process.

At runtime, after the host OS 321 is booted up on the client device 302, the emulated storage made available via the storage emulation modules 1044 of the SCHW 304 will show up as devices that are physically attached to the client device 302 (e.g., as block storage 1001-2 in the FIG. 10 example). The host OS 321 of the client device 302 can then use its standard host drivers 422 to send storage requests to the storage emulation modules 1044 via the fabrics 303. As the host OS 321 of the client device 302 tries to read and write blocks (or other data), local caching and remote I/O can be performed by the storage emulation modules 1044.

Figure 12:
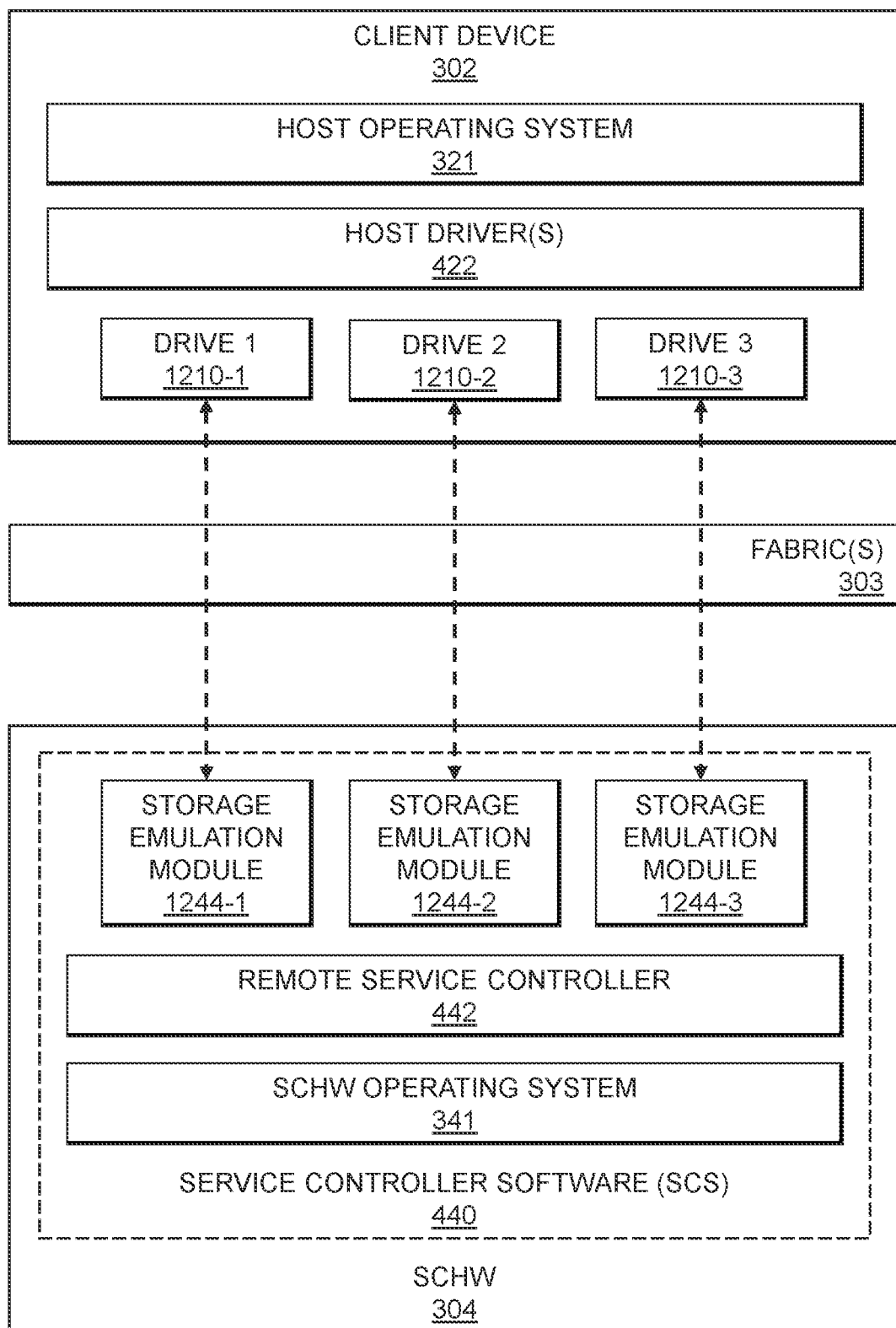
FIG. 12 shows communication between a client device and service controller software on service controller hardware for provisioning of emulated storage in an illustrative embodiment.

FIG. 12 shows an example where multiple emulated storage drives 1210-1, 1210-2 and 1210-3 (collectively, storage drives 1210) are mounted on the client device 302 using respective storage emulation modules 1244-1, 1244-2 and 1244-3 (collectively, storage emulation modules 1244) running on the SCS 440 of the SCHW 304. In some embodiments, the storage size of the backend storage supporting the emulated storage drives 1210 can be adjusted dynamically and automatically (e.g., in an automatic fashion in response to designated conditions, such as free space falling below some threshold). The user 501 can also utilize the user interface 561 of the RSS 560 to manually adjust the size of storage. In some embodiments, dynamic adjustment of the size of storage service instances is automated based on various factors, including but not limited to usage (e.g., such that a user would never run out of storage space). Various block storage management systems may be used to provide functionality for dynamically and automatically adjusting the size of storage service instances.

A user may have only one OS, or a few OSes, installed on a single client device utilizing local storage. Many applications can be installed under a single OS. Such a setup suffers from various technical problems, in that there is a potential for such applications to interfere with one another, and additional overhead is introduced to the overall system with unnecessary background tasks and libraries. The technical solutions described herein allow a user to create many different storage service instances, such as one for each of multiple use cases or operating environments (e.g., a gaming setting, a development environment, office usage, home usage, etc.). Based on the use case at a particular time, the user can boot the client device with the storage service instance best suited for that use case or operating environment. Further, different institutions, enterprises, users or other entities can create different use case or operating environment templates which may be stored on the RSS 560. When a new user needs to utilize or set up a new use case or operating environment for a client device, a replication can be made based on one or more of such templates so that the user does not need to go through the entire process or re-installing software for that new environment. As an example, an institution such as a business may create use case or operating environment templates for different personas, such as developers, data scientists, salespersons, executives, etc. Operating environment templates may in some cases be associated with different groups or levels of an enterprise hierarchy, with different operating environment templates being made available to different users of the enterprise based on their membership in different groups or levels of the enterprise hierarchy. As another example, a school may set up operating environment templates for different personas, such as teachers, students (e.g., for different grades, classes, clubs, etc.). The use of operating environment templates also provides technical solutions allowing administrators to orchestrate storage solutions for users in bulk, making management of client storage easier and more efficient.

Figure 13:
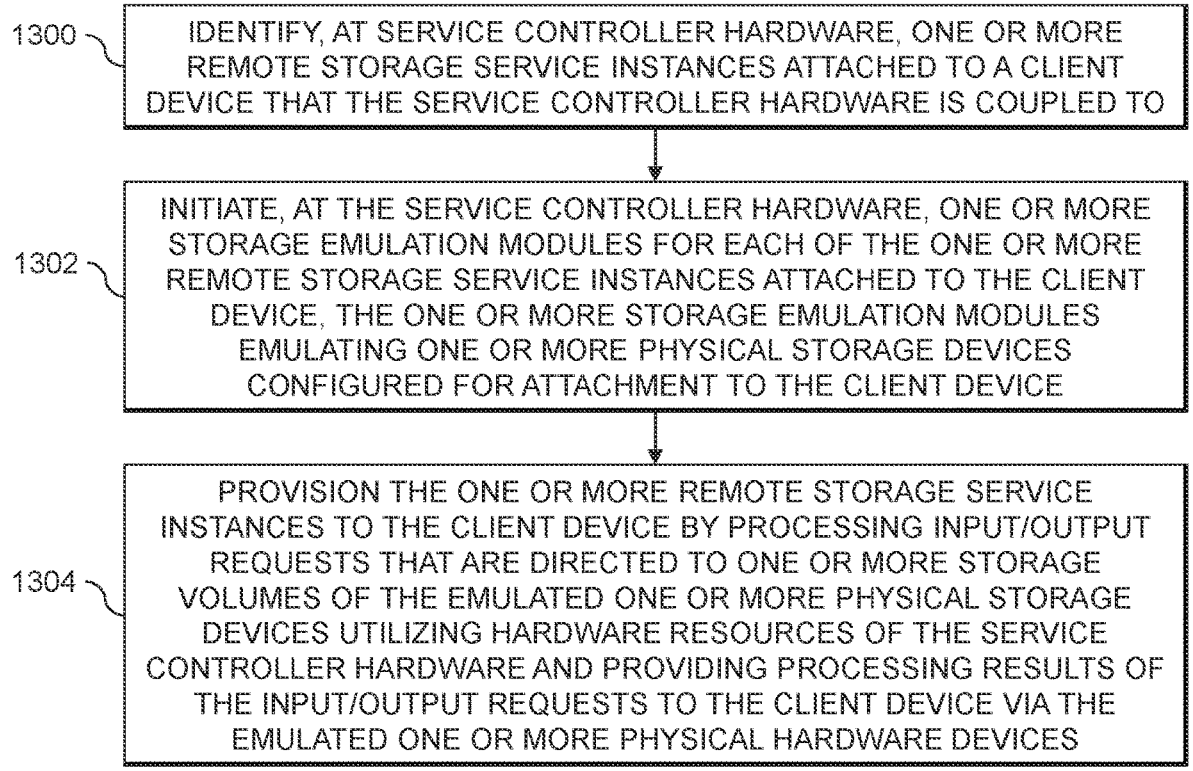
FIG. 13 is a flow diagram of an exemplary process for provisioning remote storage services on client devices using physical hardware controllers attached thereto in an illustrative embodiment.

An exemplary process for provisioning remote storage services to client devices using physical hardware controllers attached thereto will now be described in more detail with reference to the flow diagram of FIG. 13. It is to be understood that this particular process is only an example, and that additional or alternative processes for provisioning remote storage services to client devices using physical hardware controllers attached thereto can be carried out in other embodiments.

In this embodiment, the process includes steps 1300 through 1304. These steps are assumed to be performed by the SCHW 104 and RSS server 106 utilizing the remote service emulation logic 140 and remote service provisioning logic 160. The process begins with step 1300, identifying at SCHW (e.g., SCHW 104, SCHW 304) one or more remote storage service instances attached to a client device (e.g., client device 102, client device 302) that the SCHW is coupled to. The SCHW may comprise an embedded component of the client device, or an external pluggable component. Step 1300 may comprise obtaining a device identifier of the client device, and determining, utilizing the obtained device identifier of the client device, the one or more remote storage service instances attached to the client device. Determining the one or more storage service instances may utilize an RSS server (e.g., RSS server 106, RSS server 506), the one or more emulation modules being downloaded from the RSS server. In some embodiments, step 1300 includes selecting one of a set of two or more operating environment templates for the client device, each of the two or more operating environment templates being associated with a different set of one or more storage service instances.

In step 1302, the SCHW initiates one or more storage emulation modules for the one or more remote storage service instances attached to the client device, the one or more storage emulation modules emulating one or more physical storage devices configured for attachment to the client device. The SCHW may be coupled to the client device utilizing a USB fabric connection, and the emulated one or more physical storage devices may comprise one or more emulated USB OTG mass storage devices. The SCHW may alternatively be coupled to the client device utilizing a PCIe fabric connection, and the emulated one or more physical storage devices may comprise at least one of one or more emulated SSDs and one or more emulated NVMe devices.

In step 1304, the SCHW provisions the one or more remote storage service instances to the client device by processing IO requests that are directed to one or more storage volumes of the emulated one or more physical storage devices utilizing hardware resources of the SCHW and providing results of the IO requests to the client device via the emulated one or more physical storage devices. The SCHW may dynamically adjust a size of at least one of the one or more storage volumes of the emulated one or more physical storage devices. Step 1304 may comprise making at least one of the one or more storage volumes of the emulated one or more physical storage devices available as boot media for the client device. Step 1304 may also or alternatively comprise making at least one of the one or more storage volumes of the emulated one or more physical storage devices available to a host OS (e.g., host OS 321) of the client device.

In some embodiments, at least a portion of the processing of the one or more IO requests is offloaded from the hardware resources of the SCHW to a computing site (e.g., an edge computing site, a cloud computing platform, etc.) remote from the SCHW and the client device it is coupled to. At least a portion of underlying physical storage resources for the at least one storage volume of the emulated one or more physical storage devices is provided by the computing site remote from the SCHW and the client device it is coupled to. The SCHW may implement one or more caching mechanisms for data of the at least one storage volume of the emulated one or more physical storage devices, the one or more caching mechanisms reducing at least one of an amount of traffic and an amount of latency between the remote computing site and the SCHW. The one or more caching mechanisms may utilize at least one of physical memory resources of the SCHW, physical memory resources of the client device, physical storage resources of the SCHW, and physical storage resources of the client device.

Advantageously, the technical solutions described herein support provisioning and management of remote storage services without requiring any software installation on client devices. Remote storage services enable storage to be emulated and made available to client devices. From the perspective of the client devices, the remote storage appears via emulation as physically attached storage devices. No additional software or drivers would need to be installed on the client devices to support remote storage services. Based on the remote storage service configuration (e.g., by administrators or other users), the storage can be automatically and dynamically adjusted in size, and dynamically attached to different client devices.

The technical solutions described herein for remote storage services can be used by an enterprise to provide differentiation for client devices that are manufactured by or otherwise associated with that enterprise. Remote storage services offered by an enterprise or other entity can also provide additional revenue streams from cloud and edge services. Remote storage services can advantageously allow client devices to obtain a virtually infinite amount of storage space, as well as a virtually infinite number of storage media that can be remotely attached to the client devices. Furthermore, a first entity may utilize SCHW to provide remote storage services to client devices that are manufactured by or associated with a second entity. This can be achieved in a user-friendly manner through the use of externally-attached SCHW (e.g., USB-attached SCHW).

Remote storage services also advantageously make client device storage management easier for an enterprise. Consider, as an example, an enterprise solution based on a multi-cloud and edge setting. The block storage backend can be replicated across the multi-cloud and edge environment, so that a client device would be able to obtain storage with a lowest amount of latency. Administrators (e.g., of an enterprise) can also make different use case or storage environment templates available to users (e.g., employees of the enterprise) based on user persona. Such templates may include templates for basic office usage, data scientist environments, software development environments for different programming languages, etc. Based on the use case at any particular time, a user can restart a client device (or restart or re-provision emulated storage via remote storage services) and utilize different templates. Further, if a user is an employee in an office environment, the fabric between the remote storage services (e.g., remote storage services 1065 running on RSS 560 of RSS server 506) and that user's client device (e.g., client device 302) can be orchestrated from within the office with low latency and high bandwidth LAN. If the user is mobile or working remotely outside the office, additional storage orchestration for remote storage services can utilize Telco Edge or other networks.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for provisioning services on client devices using physical hardware controllers attached thereto will now be described in greater detail with reference to FIGS. 14 and 15. Although described in the context of system 100, these platforms may also be used to implement at least portions of other information processing systems in other embodiments.

Figure 14:
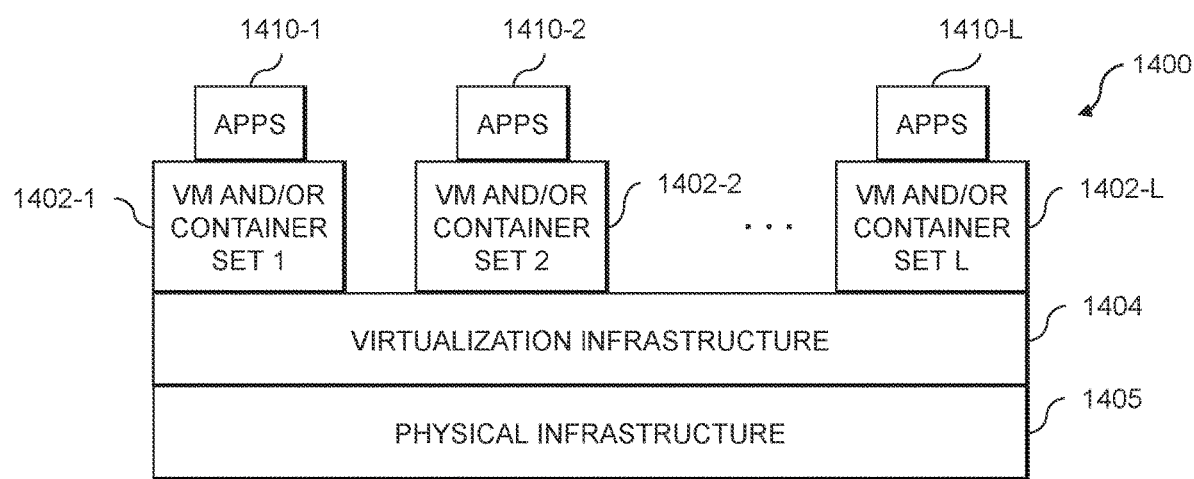
FIGS. 14 and 15 show examples of processing platforms that may be utilized to implement at least a portion of an information processing system in illustrative embodiments.
Figure 15:
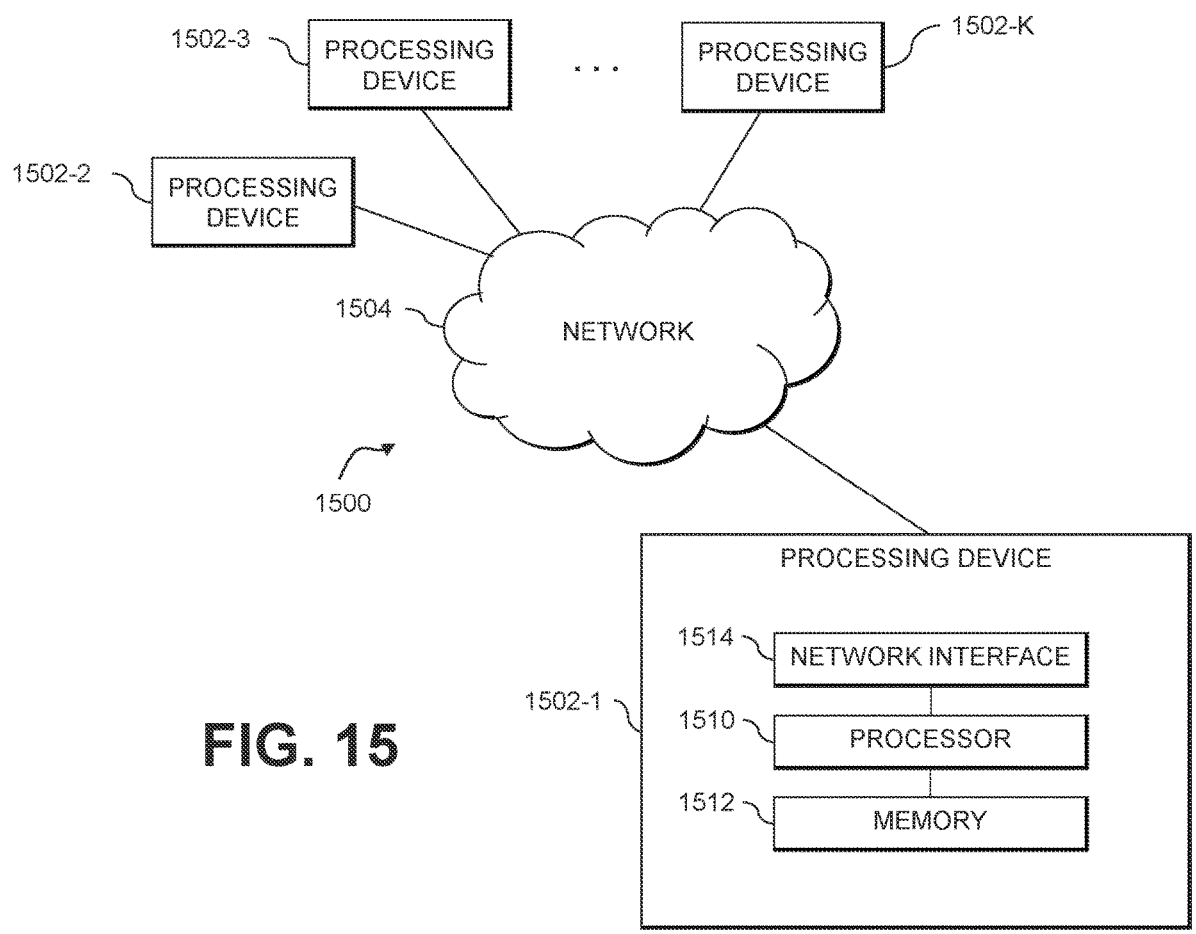

FIG. 14 shows an example processing platform comprising cloud infrastructure 1400. The cloud infrastructure 1400 comprises a combination of physical and virtual processing resources that may be utilized to implement at least a portion of the information processing system 100 in FIG. 1. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-K, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512.

The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for provisioning services on client devices using physical hardware controllers attached thereto as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, SCHW hardware, fabric connections, services, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a first processing device comprising a physical hardware controller;
the first processing device being configured for coupling with a second processing device;
the first processing device being configured to perform steps of:
identifying one or more remote storage service instances attached to the second processing device;
initiating, at the first processing device, one or more storage emulation modules for the one or more remote storage service instances attached to the second processing device, the one or more storage emulation modules emulating one or more physical storage devices configured for attachment to the second processing device; and
provisioning the one or more remote storage service instances to the second processing device by processing one or more input/output requests that are directed to one or more storage volumes of the emulated one or more physical storage devices utilizing hardware resources of the physical hardware controller and providing results of processing the one or more input/output requests to the second processing device via the emulated one or more physical storage devices.

2. The apparatus of claim 1 wherein the first processing device is configured for coupling with the second processing device utilizing at least one fabric connection, the at least one fabric connection comprises a Universal Serial Bus (USB) fabric connection, and the emulated one or more physical storage devices comprise one or more emulated USB On-The-Go (OTG) mass storage devices.

3. The apparatus of claim 1 wherein the first processing device is configured for coupling with the second processing device utilizing at least one fabric connection, the at least one fabric connection comprises a Peripheral Component Interconnect Express (PCIe) fabric connection, and the emulated one or more physical storage devices comprise at least one of one or more emulated solid-state drive (SSDs) and one or more emulated non-volatile memory express (NVMe) devices.

4. The apparatus of claim 1 wherein the first processing device is one of: internally coupled to the second processing device as an embedded component of the second processing device; and externally coupled to the second processing device as an external pluggable component.

5. The apparatus of claim 1 wherein identifying the one or more remote storage service instances attached to the second processing device comprises:
obtaining a device identifier of the second processing device; and
determining, utilizing the obtained device identifier of the second processing device, the one or more remote storage service instances attached to the second processing device.

6. The apparatus of claim 5 wherein determining the one or more remote storage service instances attached to the second processing device utilizes a remote service software server, the one or more storage emulation modules being downloaded from the remote service software server.

7. The apparatus of claim 1 wherein identifying the one or more remote storage service instances attached to the second processing device comprises selecting one of a set of two or more operating environment templates for the second processing device, each of the two or more operating environment templates being associated with a different set of one or more storage service instances.

8. The apparatus of claim 1 wherein the first processing device is further configured to perform the step of dynamically adjusting a size of at least one of the one or more storage volumes of the emulated one or more physical storage devices.

9. The apparatus of claim 1 wherein at least a portion of the processing of the one or more input/output requests is offloaded from the hardware resources of the physical hardware controller of the first processing device to a computing site remote from the first processing device and the second processing device.

10. The apparatus of claim 9 wherein at least a portion of underlying physical storage resources for said at least one of the one or more storage volumes of the emulated one or more physical storage devices is provided by the computing site remote from the first processing device and the second processing device.

11. The apparatus of claim 10 wherein the first processing device implements one or more caching mechanisms for data of said at least one of the one or more storage volumes of the emulated one or more physical storage devices, the one or more caching mechanisms reducing at least one of an amount of traffic and an amount of latency between the remote computing site and the first computing device.

12. The apparatus of claim 11 wherein the one or more caching mechanisms utilize at least one of physical memory resources of the first processing device, physical memory resources of the second processing device, physical storage resources of the first processing device, and physical storage resources of the second processing device.

13. The apparatus of claim 1 wherein provisioning the one or more remote storage service instances to the second processing device further comprises making at least one of the one or more storage volumes of the emulated one or more physical storage devices available as boot media for the second processing device.

14. The apparatus of claim 1 wherein provisioning the one or more remote storage service instances to the second processing device further comprises making at least one of the one or more storage volumes of the emulated one or more physical storage devices available to a host operating system of the second processing device.

15. A computer program product comprising a non-transitory processor-readable storage medium having stored therein program code of one or more software programs, wherein the program code when executed by a first processing device comprising a physical hardware controller causes the first processing device to perform steps of:
identifying one or more remote storage service instances attached to a second processing device that the physical hardware controller is coupled to;
initiating, at the first processing device, one or more storage emulation modules for the one or more remote storage service instances attached to the second processing device, the one or more storage emulation modules emulating one or more physical storage devices configured for attachment to the second processing device; and
provisioning the one or more remote storage service instances to the second processing device by processing one or more input/output requests that are directed to one or more storage volumes of the emulated one or more physical storage devices utilizing hardware resources of the physical hardware controller and providing results of processing the one or more input/output requests to the second processing device via the emulated one or more physical storage devices.

16. The computer program product of claim 15 wherein identifying the one or more remote storage service instances attached to the second processing device comprises:
obtaining a device identifier of the second processing device; and
determining, utilizing the obtained device identifier of the second processing device, the one or more remote storage service instances attached to the second processing device.

17. The computer program product of claim 15 wherein at least a portion of the processing of the one or more input/output requests is offloaded from the hardware resources of the physical hardware controller of first processing device to a computing site remote from the first processing device and the second processing device.

18. A method comprising:
identifying, at a first processing device comprising a physical hardware controller coupled to a second processing device, one or more remote storage service instances attached to the second processing device;
initiating, at the first processing device, one or more storage emulation modules for the one or more remote storage service instances attached to the second processing device, the one or more storage emulation modules emulating one or more physical storage devices configured for attachment to the second processing device; and
provisioning the one or more remote storage service instances to the second processing device by processing one or more input/output requests that are directed to one or more storage volumes of the emulated one or more physical storage devices utilizing hardware resources of the physical hardware controller and providing results of processing the one or more input/output requests to the second processing device via the emulated one or more physical storage devices;
wherein the method is performed by the first processing device.

19. The method of claim 18 wherein identifying the one or more remote storage service instances attached to the second processing device comprises:
obtaining a device identifier of the second processing device; and
determining, utilizing the obtained device identifier of the second processing device, the one or more remote storage service instances attached to the second processing device.

20. The method of claim 18 wherein at least a portion of the processing of the one or more input/output requests is offloaded from the hardware resources of the physical hardware controller of the first processing device to a computing site remote from the first processing device and the second processing device.

* * * * *